United States Patent
Ang et al.

(10) Patent No.: US 11,452,165 B2
(45) Date of Patent: Sep. 20, 2022

(54) DISCONTINUOUS RECEPTION TECHNIQUES WITH NON-UNIFORM CYCLE DURATIONS

(71) Applicant: QUALCOMM Incorporated, San Diego, CA (US)

(72) Inventors: Peter Pui Lok Ang, San Diego, CA (US); Linhai He, San Diego, CA (US); Prashanth Haridas Hande, San Diego, CA (US); Jay Kumar Sundararajan, San Diego, CA (US); Naga Bhushan, San Diego, CA (US); Tingfang Ji, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 56 days.

(21) Appl. No.: 16/892,813

(22) Filed: Jun. 4, 2020

(65) Prior Publication Data

US 2020/0389933 A1 Dec. 10, 2020

Related U.S. Application Data

(60) Provisional application No. 62/858,833, filed on Jun. 7, 2019.

(51) Int. Cl.
*H04W 76/28* (2018.01)
*H04W 52/02* (2009.01)
*H04W 80/02* (2009.01)

(52) U.S. Cl.
CPC ....... *H04W 76/28* (2018.02); *H04W 52/0232* (2013.01); *H04W 52/0258* (2013.01); *H04W 80/02* (2013.01)

(58) Field of Classification Search
None
See application file for complete search history.

(56) References Cited

U.S. PATENT DOCUMENTS

| | | |
|---|---|---|
| 2009/0232118 A1 | 9/2009 | Wang et al. |
| 2015/0173122 A1* | 6/2015 | Schliwa-Bertling ........ H04W 56/001 370/311 |

(Continued)

OTHER PUBLICATIONS

Intel Corporation: "C-DRX Enhancements," 3GPP Draft, 3GPP TSG RAN WG2 Meeting #105bis, R2-1904434_PWS_C-DRX, 3rd Generation Partnership Project (3GPP), Mobile Competence Centre, 650, Route Des Lucioles, F-06921, Sophia-Antipolis Cedex, France, vol. RAN WG2, No. Xi'an, China; Apr. 8, 2019-Apr. 12, 2019, Mar. 29, 2019 (Mar. 29, 2019), XP051693650, 2 pages, Retrieved from the Internet: URL: http://www.3gpp.org/ftp/tsg%5Fran/WG2%5FRL2/TSGR2%5F105bis/Docs/R2%2D1904434%2Ezip [retrieved on Mar. 29, 2019] the whole document.

(Continued)

*Primary Examiner* — Alex Skripnikov
(74) *Attorney, Agent, or Firm* — Holland & Hart LLP

(57) ABSTRACT

Methods, systems, and devices for wireless communications are described for configuring discontinuous reception (DRX) cycles within a DRX time period at a user equipment (UE). DRX configurations may provide that different DRX cycles have non-uniform cycle durations within the DRX time period. Such non-uniform cycle durations may provide DRX ON-durations that are aligned with a periodicity of downlink traffic to the UE in which the downlink traffic may be unaligned with timing boundaries used for wireless communications between the UE and a base station, such as slot boundaries or symbol boundaries.

26 Claims, 21 Drawing Sheets

(56) References Cited

U.S. PATENT DOCUMENTS

2017/0070312 A1 3/2017 Yi et al.
2019/0335528 A1* 10/2019 Bin Sediq ........... H04W 72/042

OTHER PUBLICATIONS

Intel Corporation: "Ready State Discontinuous Reception for Cellular IoT," 3GPP Draft, 3GPP TSG-GERAN#68, GP-151080, Ready State DRX, 3rd Generation Partnership Project (3GPP), Mobile Competence Centre, 650, Route Des Lucioles, F-06921, Sophia-Antipolis Cedex, France, vol. TSG GERAN, No. Anaheim, CA, U.S.A, Nov. 16, 2015-Nov. 20, 2015, Nov. 16, 2015 (Nov. 16, 2015), XP051627681, 11 pages, Retrieved from the Internet: URL: http://www.3gpp.org/ftp/tsg%5Fgeran/TSG%5FGERAN/GERAN%5F68%5FAnaheim/Docs/GP%2D151080%2Ezip [retrieved on Nov. 16, 2015] the whole document.
International Search Report and Written Opinion—PCT/US2020/036314—ISA/EPO—dated Sep. 25, 2020.
Motorola Mobility: "Paging Channel Reliability Issue in Idle Mode," 3GPP Draft, 3GPP TSG-RAN WG4 Meeting #57_AH, R4-110011—Paging and ABSF, 3rd Generation Partnership Project (3GPP), Mobile Competence Centre, 650, Route Des Lucioles, F-06921, Sophia-Antipolis Cedex, France, vol. RAN WG4, No. Austin; Jan. 17, 2011-Jan. 21, 2011, Jan. 11, 2011 (Jan. 11, 2011), XP050500197, 5 pages, [retrieved on Jan. 11, 2011] the whole document.
Motorola: "Paging Channel Reliability Issue in Idle Mode and ABSF Patterns," 3GPP Draft, 3GPP TSG-RAN WG4 Meeting #57, R4-104648—Paging and ABSF, 3rd Generation Partnership Project (3GPP), Mobile Competence Centre, 650, Route Des Lucioles, F-06921, Sophia-Antipolis Cedex, France, vol. RAN WG4, No. Jacksonville, Nov. 15, 2010-Nov. 19, 2010, Nov. 12, 2010 (Nov. 12, 2010), XP050468647, 5 pages, [retrieved on Nov. 12, 2010] the whole document.
Qualcomm Incorporated: "Remaining Issues on C-DRX for Short TTI," 3GPP Draft, 3GPP TSG-RAN2 Meeting #99, R2-1709647 STTI DRX, 3rd Generation Partnership Project (3GPP), Mobile Competence Centre, 650, Route Des Lucioles, F-06921, Sophia-Antipolis Cedex, France, vol. RAN WG2, No. Berlin, Germany, Aug. 20, 2017-Aug. 20, 2017, Aug. 20, 2017 (Aug. 20, 2017), XP051319361, 2 pages, Retrieved from the Internet: URL: http://www.3gpp.org/ftp/Meetings_3GPP_SYNC/RAN2/Docs/ [retrieved on Aug. 20, 2017] the whole document.

* cited by examiner

DISCONTINUOUS RECEPTION TECHNIQUES WITH NON-UNIFORM CYCLE DURATIONS

CROSS REFERENCE

The present Applications for patent claims the benefit of U.S. Provisional Patent Application No. 62/858,833 by ANG et al., entitled "DISCONTINUOUS RECEPTION TECHNIQUES WITH NON-UNIFORM CYCLE DURATIONS," filed Jun. 7, 2019, assigned to the assignee hereof, and expressly incorporated by reference herein.

BACKGROUND

The following relates generally to wireless communications, and more specifically to discontinuous reception techniques with non-uniform cycle durations.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). Some wireless communications systems may support UEs operating in a discontinuous reception (DRX) mode. UEs in a DRX mode may transition between a sleep state for power conservation and an active state for data transmission and reception (during an ON-duration) according to a DRX configuration.

SUMMARY

The described techniques relate to improved methods, systems, devices, and apparatuses that support discontinuous reception (DRX) techniques with non-uniform cycle durations. In accordance with various aspects, techniques are provided for configuring DRX cycles within a DRX time period at a user equipment (UE) such that different DRX cycles have non-uniform cycle durations within the DRX time period. Such non-uniform cycle durations may provide DRX ON-durations that are aligned with a periodicity of downlink traffic to the UE. In some cases, the DRX time period may correspond to an anchor cycle that spans a set of DRX cycles, and a subset of the set of DRX cycles may have a different cycle duration than other DRX cycles of the set of DRX cycles. In some cases, an ON-duration offset value may be indicated for one or more DRX cycles within the DRX time period (e.g., via downlink control information or a medium access control (MAC) control element (CE)). In other cases, multiple DRX configurations may be configured, including an outer cycle having a cycle duration that corresponds to the DRX time period, and an inner cycle in which a set of inner DRX cycles are within one outer cycle duration, and where different inner cycles may have different cycle durations. In further cases, DRX cycles may be configured to have a cycle duration that corresponds to a rational number that is selected to correspond to the periodicity of the downlink traffic to the UE.

A method of wireless communication at a UE is described. The method may include receiving a discontinuous reception cycle configuration from a base station that indicates a discontinuous reception cycle associated with a discontinuous reception period, the discontinuous reception cycle having an ON-duration during which the UE is to wake up from a sleep mode to monitor for transmissions from the base station, determining, based on the discontinuous reception cycle configuration, a plurality of start times comprising a start time for the ON-duration of the discontinuous reception cycle and a start time for an additional ON-duration different from the ON-duration of the discontinuous reception cycle, the start time for the additional ON-duration being within the discontinuous reception period, and initiating a wakeup procedure for the UE at each of the plurality of start times based on the determining.

An apparatus for wireless communication at a UE is described. The apparatus may include a processor, memory coupled with the processor, and instructions stored in the memory. The instructions may be executable by the processor to cause the apparatus to receive a discontinuous reception cycle configuration from a base station that indicates a discontinuous reception cycle associated with a discontinuous reception period, the discontinuous reception cycle having an ON-duration during which the UE is to wake up from a sleep mode to monitor for transmissions from the base station, determine, based on the discontinuous reception cycle configuration, a plurality of start times comprising a start time for the ON-duration of the discontinuous reception cycle and a start time for an additional ON-duration different from the ON-duration of the discontinuous reception cycle, the start time for the additional ON-duration being within the discontinuous reception period, and initiate a wakeup procedure for the UE at each of the plurality of start times based on the determining.

Another apparatus for wireless communication at a UE is described. The apparatus may include means for receiving a discontinuous reception cycle configuration from a base station that indicates a discontinuous reception cycle associated with a discontinuous reception period, the discontinuous reception cycle having an ON-duration during which the UE is to wake up from a sleep mode to monitor for transmissions from the base station, means for determining, based on the discontinuous reception cycle configuration, a plurality of start times comprising a start time for the ON-duration of the discontinuous reception cycle and a start time for an additional ON-duration different from the ON-duration of the discontinuous reception cycle, the start time for the additional ON-duration being within the discontinuous reception period, and means for initiating a wakeup procedure for the UE at each of the plurality of start times based on the determining.

A non-transitory computer-readable medium storing code for wireless communication at a UE is described. The code may include instructions executable by a processor to receive a discontinuous reception cycle configuration from a base station that indicates a discontinuous reception cycle associated with a discontinuous reception period, the discontinuous reception cycle having an ON-duration during which the UE is to wake up from a sleep mode to monitor for transmissions from the base station, determine, based on the discontinuous reception cycle configuration, a plurality of start times comprising a start time for the ON-duration of the discontinuous reception cycle and a start time for an additional ON-duration different from the ON-duration of the discontinuous reception cycle, the start time for the additional ON-duration being within the discontinuous reception period, and initiate a wakeup procedure for the UE at each of the plurality of start times based on the determining.

In some examples of the method, apparatuses, and non-transitory computer-readable medium described herein, the discontinuous reception period may be a period between consecutive ON-durations that has a duration different from a period between the ON-duration and the additional ON-duration. In some examples of the method, apparatuses, and non-transitory computer-readable medium described herein, the discontinuous reception cycle has a period equal to the discontinuous reception period. In some examples of the method, apparatuses, and non-transitory computer-readable medium described herein, the determining the plurality of start times may include operations, features, means, or instructions for determining the start time for the additional ON-duration based on a starting offset, and where the starting offset is a known or determined starting value.

Some examples of the method, apparatuses, and non-transitory computer-readable medium described herein may include operations, features, means, or instructions for receiving an indication of a starting offset, the receiving the indication being different from the receiving the discontinuous reception cycle configuration, and where the determining the plurality of start times may include operations, features, means, or instructions for determining the start time for the additional ON-duration based at least in part on the starting offset.

In some examples of the method, apparatuses, and non-transitory computer-readable medium described herein, the discontinuous reception cycle configuration may be an indication of a first starting offset, and where the determining the plurality of start times may include operations, features, means, or instructions for determining the start time for the additional ON-duration based on the first starting offset. In some examples of the method, apparatuses, and non-transitory computer-readable medium described herein, the determining the plurality of start times may include operations, features, means, or instructions for determining a start time for a second additional ON-duration based on the first starting offset.

In some examples of the method, apparatuses, and non-transitory computer-readable medium described herein, the receiving the discontinuous reception cycle configuration may include operations, features, means, or instructions for receiving an indication of a second starting offset, and where the determining the plurality of start times may include operations, features, means, or instructions for determining a start time for a second additional ON-duration based on the second starting offset, the start time for the second additional ON-duration being within the discontinuous reception period.

In some examples of the method, apparatuses, and non-transitory computer-readable medium described herein, the receiving the discontinuous reception cycle configuration may include operations, features, means, or instructions for receiving an indication of a first inner discontinuous reception cycle starting offset and a second inner discontinuous reception cycle starting offset, where a first inner discontinuous reception cycle has a period that is different from a period of a second inner discontinuous reception cycle, and where the first inner discontinuous reception cycle and the second inner discontinuous reception cycle may be aligned within the discontinuous reception cycle associated with the discontinuous reception period.

In some examples of the method, apparatuses, and non-transitory computer-readable medium described herein, the receiving the discontinuous reception cycle configuration may include operations, features, means, or instructions for receiving an indication of an anchor cycle that has as a period equal to the discontinuous reception period, and where the discontinuous reception cycle associated with the discontinuous reception period has a period less than the discontinuous reception period. In some examples of the method, apparatuses, and non-transitory computer-readable medium described herein, the receiving the discontinuous reception cycle configuration may include operations, features, means, or instructions for receiving an indication of an additional discontinuous reception cycle associated with the discontinuous reception period, where the additional discontinuous reception cycle associated with the discontinuous reception period has a period less than the discontinuous reception period. In some examples of the method, apparatuses, and non-transitory computer-readable medium described herein, the additional discontinuous reception cycle has a period that is less than the discontinuous reception period and different from the period of the discontinuous reception cycle. In some examples of the method, apparatuses, and non-transitory computer-readable medium described herein, the discontinuous reception cycle may indicate a first discontinuous reception cycle duration for a first subset of a plurality of discontinuous reception cycles within the anchor cycle and the additional discontinuous reception cycle may indicate a second discontinuous reception cycle duration for one or more leap cycles within the anchor cycle.

Some examples of the method, apparatuses, and non-transitory computer-readable medium described herein may include operations, features, means, or instructions for performing one or more radio resource management procedures based on the discontinuous reception period.

In some examples of the method, apparatuses, and non-transitory computer-readable medium described herein, the receiving the discontinuous reception cycle configuration may include operations, features, means, or instructions for receiving an indication of a rational number, and where the determining the plurality of start times may include operations, features, means, or instructions for determining the start time for the additional ON-duration based at least in part on the rational number. Some examples of the method, apparatuses, and non-transitory computer-readable medium described herein may include operations, features, means, or instructions for adjusting the start time for the additional ON-duration to align with a timing boundary used for wireless communications between the UE and the base station. In some examples of the method, apparatuses, and non-transitory computer-readable medium described herein, the adjusting the start time may include operations, features, means, or instructions for adjusting the start time for the additional ON-duration to align with a timing boundary nearest to the start time for the additional ON-duration based on the rational number, a timing boundary subsequent to the start time for the additional ON-duration based at least in part on the rational number, or a timing boundary preceding the start time for the additional ON-duration based on the rational number. In some examples of the method, apparatuses, and non-transitory computer-readable medium described herein, the timing boundary is a slot boundary or a symbol boundary. Some examples of the method, apparatuses, and non-transitory computer-readable medium described herein may include operations, features, means, or instructions for initiating a discontinuous reception cycle inactivity timer based at least in part on an absolute time relative to the start time for the additional ON-duration based at least in part on the rational number or the adjusted start time for the additional ON-duration to align with the timing boundary.

A method of wireless communication at a base station is described. The method may include identifying a traffic periodicity associated with wireless communications traffic to a UE, determining, based at least in part on the traffic periodicity, a discontinuous reception cycle associated with a discontinuous reception period, the discontinuous reception cycle having an ON-duration during which the UE is to wake up from a sleep mode to monitor for transmissions from the base station, and a start time for an additional ON-duration different from the ON-duration of the discontinuous reception cycle, the start time for the additional ON-duration being within the discontinuous reception period, and transmitting a discontinuous reception cycle configuration that indicates at least the discontinuous reception cycle associated with the discontinuous reception period to the UE.

In some examples of the method, apparatuses, and non-transitory computer-readable medium described herein, the discontinuous reception period may include operations, features, means, or instructions for a period between consecutive ON-durations that has a duration different from a period between the ON-duration and the additional ON-duration. In some examples of the method, apparatuses, and non-transitory computer-readable medium described herein, the discontinuous reception cycle has a period equal to the discontinuous reception period.

Some examples of the method, apparatuses, and non-transitory computer-readable medium described herein may include operations, features, means, or instructions for transmitting an indication of a starting offset for determining the start time for the additional ON-duration, the transmitting the indication being different from the transmitting the discontinuous reception cycle configuration. In some examples of the method, apparatuses, and non-transitory computer-readable medium described herein, the discontinuous reception cycle configuration may include an indication of a first starting offset for determining the start time for the additional ON-duration.

In some examples of the method, apparatuses, and non-transitory computer-readable medium described herein, the transmitting the discontinuous reception cycle configuration may include operations, features, means, or instructions for transmitting an indication of an anchor cycle that has a period equal to the discontinuous reception period, and wherein the discontinuous reception cycle associated with the discontinuous reception period has a period less than the discontinuous reception period.

In some examples of the method, apparatuses, and non-transitory computer-readable medium described herein, the transmitting the discontinuous reception cycle configuration may include operations, features, means, or instructions for transmitting an indication of a rational number, the rational number being associated with the start time for the additional ON-duration.

A method of wireless communication at a UE is described. The method may include receiving a discontinuous reception cycle configuration from a base station that indicates a set of discontinuous reception cycles within a discontinuous reception period that each have an ON-duration during which the UE is to wake up from a sleep mode to monitor for transmissions from the base station, and where the UE transitions to the sleep mode after one or more of the ON-durations until the start of a subsequent ON-duration, determining, based on the discontinuous reception cycle configuration, a set of start times for the set of ON-durations within the discontinuous reception period, where at least one of the set of discontinuous reception cycles has a different cycle duration than other of the set of discontinuous reception cycles, and initiating a wakeup procedure for the UE at each of the set of start times based on the determining.

An apparatus for wireless communication at a UE is described. The apparatus may include a processor, memory coupled with the processor, and instructions stored in the memory. The instructions may be executable by the processor to cause the apparatus to receive a discontinuous reception cycle configuration from a base station that indicates a set of discontinuous reception cycles within a discontinuous reception period that each have an ON-duration during which the UE is to wake up from a sleep mode to monitor for transmissions from the base station, and where the UE transitions to the sleep mode after one or more of the ON-durations until the start of a subsequent ON-duration, determine, based on the discontinuous reception cycle configuration, a set of start times for the set of ON-durations within the discontinuous reception period, where at least one of the set of discontinuous reception cycles has a different cycle duration than other of the set of discontinuous reception cycles, and initiate a wakeup procedure for the UE at each of the set of start times based on the determining.

Another apparatus for wireless communication at a UE is described. The apparatus may include means for receiving a discontinuous reception cycle configuration from a base station that indicates a set of discontinuous reception cycles within a discontinuous reception period that each have an ON-duration during which the UE is to wake up from a sleep mode to monitor for transmissions from the base station, and where the UE transitions to the sleep mode after one or more of the ON-durations until the start of a subsequent ON-duration, means for determining, based on the discontinuous reception cycle configuration, a set of start times for the set of ON-durations within the discontinuous reception period, where at least one of the set of discontinuous reception cycles has a different cycle duration than other of the set of discontinuous reception cycles, and means for initiating a wakeup procedure for the UE at each of the set of start times based on the determining.

A non-transitory computer-readable medium storing code for wireless communication at a UE is described. The code may include instructions executable by a processor to receive a discontinuous reception cycle configuration from a base station that indicates a set of discontinuous reception cycles within a discontinuous reception period that each have an ON-duration during which the UE is to wake up from a sleep mode to monitor for transmissions from the base station, and where the UE transitions to the sleep mode after one or more of the ON-durations until the start of a subsequent ON-duration, determine, based on the discontinuous reception cycle configuration, a set of start times for the set of ON-durations within the discontinuous reception period, where at least one of the set of discontinuous reception cycles has a different cycle duration than other of the set of discontinuous reception cycles, and initiate a wakeup procedure for the UE at each of the set of start times based on the determining.

In some examples of the method, apparatuses, and non-transitory computer-readable medium described herein, the receiving the discontinuous reception cycle configuration may include operations, features, means, or instructions for receiving an indication of an anchor cycle that corresponds to the discontinuous reception period and that spans the set of discontinuous reception cycles and the cycle duration associated with each discontinuous reception cycle of the set of discontinuous reception cycles. In some examples of the method, apparatuses, and non-transitory computer-readable medium described herein, the receiving the discontinuous reception cycle configuration further may include operations, features, means, or instructions for receiving radio resource control signaling that indicates the anchor cycle, a number of discontinuous reception cycles within the anchor cycle, and the cycle duration of each of the discontinuous reception cycles.

In some examples of the method, apparatuses, and non-transitory computer-readable medium described herein, the discontinuous reception cycle configuration includes a first discontinuous reception cycle duration for a first subset of the set of discontinuous reception cycles and a second discontinuous reception cycle duration for one or more leap cycles of the set of discontinuous reception cycles. In some examples of the method, apparatuses, and non-transitory computer-readable medium described herein, one or more radio resource management procedures may be performed based on the anchor cycle.

In some examples of the method, apparatuses, and non-transitory computer-readable medium described herein, the receiving the discontinuous reception cycle configuration may include operations, features, means, or instructions for receiving an indication of the cycle duration for each of the set of discontinuous reception cycles, a first starting offset for a first ON-duration within at least a first discontinuous reception cycle of the set of discontinuous reception cycles, and a second starting offset for a second ON-duration within at least a second discontinuous reception cycle of the set of discontinuous reception cycles, where the first starting offset may be different than the second starting offset. In some examples of the method, apparatuses, and non-transitory computer-readable medium described herein, one or more of the first starting offset or the second starting offset may be a predetermined starting offset or may be signaled by the base station. In some examples of the method, apparatuses, and non-transitory computer-readable medium described herein, one or more of the first starting offset or the second starting offset may be signaled by the base station in one or more of downlink control information or a MAC-CE.

In some examples of the method, apparatuses, and non-transitory computer-readable medium described herein, the receiving the discontinuous reception cycle configuration may include operations, features, means, or instructions for receiving an outer discontinuous reception cycle configuration that indicates a first duration of an outer discontinuous reception cycle, where each outer discontinuous reception cycle may have a same first duration that corresponds to the discontinuous reception period, and receiving an inner discontinuous reception cycle configuration that indicates two or more inner discontinuous reception cycles within each outer discontinuous reception cycle and where the cycle duration may be associated with each inner discontinuous reception cycle, where at least one of the inner discontinuous reception cycles may have a different cycle duration than other of the inner discontinuous reception cycles. In some examples of the method, apparatuses, and non-transitory computer-readable medium described herein, one or more radio resource management procedures may be performed based on the outer discontinuous reception cycle configuration. In some examples of the method, apparatuses, and non-transitory computer-readable medium described herein, a start of an initial inner discontinuous reception cycle may be aligned with a start of an outer discontinuous reception cycle, and an end of a last discontinuous reception cycle may be aligned with an end of the outer discontinuous reception cycle.

In some examples of the method, apparatuses, and non-transitory computer-readable medium described herein, the receiving the discontinuous reception cycle configuration may include operations, features, means, or instructions for receiving an indication of a rational number that indicates a duration associated with each discontinuous reception cycle within the discontinuous reception period, and adjusting the start time of each of the set of ON-durations to align with a timing boundary used for wireless communications between the UE and the base station. In some examples of the method, apparatuses, and non-transitory computer-readable medium described herein, the start time of each of the set of ON-durations may be adjusted to align with a nearest timing boundary, a next timing boundary, or a previous timing boundary. In some examples of the method, apparatuses, and non-transitory computer-readable medium described herein, the timing boundary may be a slot boundary or a symbol boundary. Some examples of the method, apparatuses, and non-transitory computer-readable medium described herein may further include operations, features, means, or instructions for initiating a discontinuous reception cycle inactivity timer based on an absolute time relative to each ON-duration or adjusted ON-duration.

A method of wireless communication at a base station is described. The method may include identifying a traffic periodicity for wireless communications traffic that is transmitted to a UE, determining, based on the traffic periodicity, a discontinuous reception cycle configuration for the UE that indicates a set of discontinuous reception cycles within a discontinuous reception period that each have an ON-duration during which the UE is to wake up from a sleep mode to monitor for transmissions from the base station, where the UE transitions to the sleep mode after one or more of the ON-durations until the start of a subsequent ON-duration, and where at least one of the set of discontinuous reception cycles has a different cycle duration than other of the set of discontinuous reception cycles within the discontinuous reception period, and transmitting the discontinuous reception cycle configuration to the UE.

An apparatus for wireless communication at a base station is described. The apparatus may include a processor, memory coupled with the processor, and instructions stored in the memory. The instructions may be executable by the processor to cause the apparatus to identify a traffic periodicity for wireless communications traffic that is transmitted to a UE, determine, based on the traffic periodicity, a discontinuous reception cycle configuration for the UE that indicates a set of discontinuous reception cycles within a discontinuous reception period that each have an ON-duration during which the UE is to wake up from a sleep mode to monitor for transmissions from the base station, where the UE transitions to the sleep mode after one or more of the ON-durations until the start of a subsequent ON-duration, and where at least one of the set of discontinuous reception cycles has a different cycle duration than other of the set of discontinuous reception cycles within the discontinuous reception period, and transmit the discontinuous reception cycle configuration to the UE.

Another apparatus for wireless communication at a base station is described. The apparatus may include means for identifying a traffic periodicity for wireless communications traffic that is transmitted to a UE, determining, based on the traffic periodicity, a discontinuous reception cycle configuration for the UE that indicates a set of discontinuous reception cycles within a discontinuous reception period that each have an ON-duration during which the UE is to wake up from a sleep mode to monitor for transmissions from the base station, where the UE transitions to the sleep mode after one or more of the ON-durations until the start of a subsequent ON-duration, and where at least one of the set of discontinuous reception cycles has a different cycle duration than other of the set of discontinuous reception cycles within the discontinuous reception period, and means for transmitting the discontinuous reception cycle configuration to the UE.

A non-transitory computer-readable medium storing code for wireless communication at a base station is described. The code may include instructions executable by a processor to identify a traffic periodicity for wireless communications traffic that is transmitted to a UE, determine, based on the traffic periodicity, a discontinuous reception cycle configuration for the UE that indicates a set of discontinuous reception cycles within a discontinuous reception period that each have an ON-duration during which the UE is to wake up from a sleep mode to monitor for transmissions from the base station, where the UE transitions to the sleep mode after one or more of the ON-durations until the start of a subsequent ON-duration, and where at least one of the set of discontinuous reception cycles has a different cycle duration than other of the set of discontinuous reception cycles within the discontinuous reception period, and transmit the discontinuous reception cycle configuration to the UE.

In some examples of the method, apparatuses, and non-transitory computer-readable medium described herein, the discontinuous reception period corresponds to an anchor cycle duration that spans the set of discontinuous reception cycles, and where at least one of the set of discontinuous reception cycles may have a different cycle duration than other of the set of discontinuous reception cycles. In some examples of the method, apparatuses, and non-transitory computer-readable medium described herein, the transmitting may include operations, features, means, or instructions for transmitting radio resource control signaling that indicates the anchor cycle duration, a number of discontinuous reception cycles within the anchor cycle duration, and the cycle duration of each of the discontinuous reception cycles. In some examples of the method, apparatuses, and non-transitory computer-readable medium described herein, the discontinuous reception cycle configuration includes a first discontinuous reception cycle duration for a first subset of the set of discontinuous reception cycles and a second discontinuous reception cycle duration for one or more leap cycles of the set of discontinuous reception cycles. In some examples of the method, apparatuses, and non-transitory computer-readable medium described herein, one or more radio resource management procedures may be performed based on the anchor cycle duration.

In some examples of the method, apparatuses, and non-transitory computer-readable medium described herein, the discontinuous reception cycle configuration includes a first starting offset for a first ON-duration within at least a first discontinuous reception cycle of the set of discontinuous reception cycles, and a second starting offset for a second ON-duration within at least a second discontinuous reception cycle of the set of discontinuous reception cycles, where the first starting offset may be different than the second starting offset. In some examples of the method, apparatuses, and non-transitory computer-readable medium described herein, one or more of the first starting offset or the second starting offset may be a predetermined starting offset or may be signaled to the UE. In some examples of the method, apparatuses, and non-transitory computer-readable medium described herein, one or more of the first starting offset or the second starting offset may be signaled to the UE in one or more of downlink control information or a MAC-CE.

In some examples of the method, apparatuses, and non-transitory computer-readable medium described herein, the discontinuous reception cycle configuration includes an outer discontinuous reception cycle configuration that indicates a first duration of an outer discontinuous reception cycle that corresponds to the discontinuous reception period, where each outer discontinuous reception cycle may have a same first duration, and where, and the discontinuous reception cycle configuration further includes an inner discontinuous reception cycle configuration that indicates two or more inner discontinuous reception cycles within each outer discontinuous reception, and where the cycle duration may be associated with each inner discontinuous reception cycle and at least one of the inner discontinuous reception cycles may have a different cycle duration than other of the inner discontinuous reception cycles. In some examples of the method, apparatuses, and non-transitory computer-readable medium described herein, one or more radio resource management procedures may be performed based on the outer discontinuous reception cycle configuration. In some examples of the method, apparatuses, and non-transitory computer-readable medium described herein, a start of an initial inner discontinuous reception cycle may be aligned with a start of an outer discontinuous reception cycle, and an end of a last discontinuous reception cycle may be aligned with an end of the outer discontinuous reception cycle.

In some examples of the method, apparatuses, and non-transitory computer-readable medium described herein, the discontinuous reception cycle configuration includes an indication of a rational number that indicates the cycle duration associated with each discontinuous reception cycle within the discontinuous reception period, and where a start time of each of the set of ON-durations may be adjusted at the UE to align with a timing boundary used for wireless communications between the UE and the base station. In some examples of the method, apparatuses, and non-transitory computer-readable medium described herein, the start time of each of the set of ON-durations may be adjusted to align with a nearest timing boundary, a next timing boundary, or a previous timing boundary. In some examples of the method, apparatuses, and non-transitory computer-readable medium described herein, the timing boundary may be a slot boundary or a symbol boundary.

DETAILED DESCRIPTION

Figure 1:
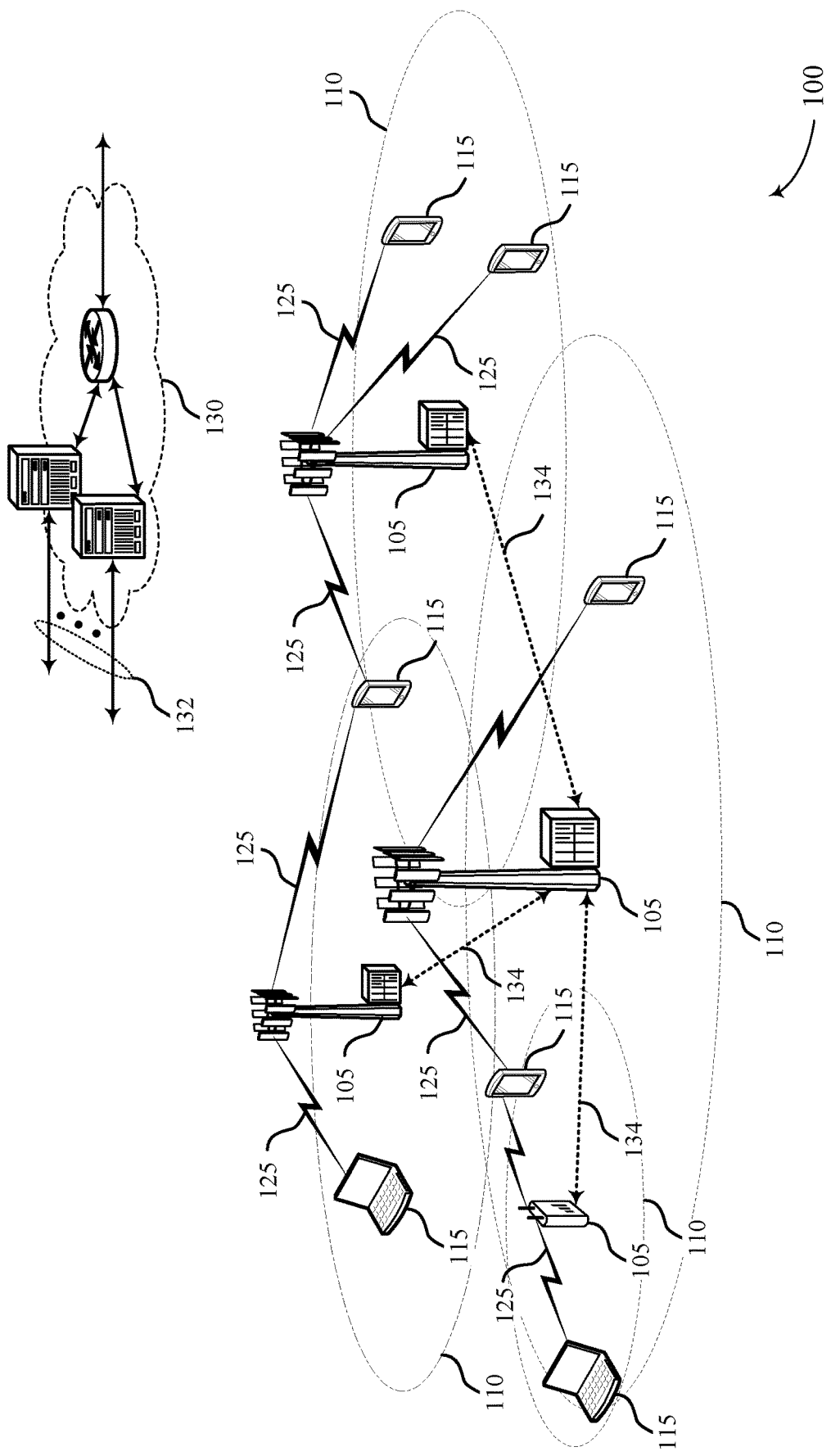
FIG. 1 illustrates an example of a system for wireless communications that supports discontinuous reception techniques with non-uniform cycle durations in accordance with aspects of the present disclosure.

Some wireless communications systems may have transmissions between a user equipment (UE) and a base station that follow a somewhat regular or periodic pattern. For example, certain types of extended reality (XR) applications may have traffic that has a regular or periodic pattern. XR applications may include, for example, cloud gaming applications, virtual reality (VR) split rendering applications, augmented reality (AR) split computation applications, and the like. Further, a UE in some cases may be configured with a discontinuous reception (DRX) configuration in which the UE transitions to a power-saving sleep state between ON-durations in which the UE monitors for communications from the base station. In some cases, the regular or periodic pattern may have a periodicity that does not correspond with an integer value of possible starting locations of DRX ON-durations. Various aspects of the present disclosure provide techniques for non-uniform DRX cycle durations within a certain DRX time period that may accommodate such a periodicity of traffic to the UE.

In some cases, such non-uniform cycle durations may provide DRX ON-durations that are aligned with a periodicity of UE traffic. In some cases, multiple DRX configurations may be configured, including an outer cycle configuration having a cycle duration that corresponds to the DRX time period, and an inner cycle configuration in which a set of inner DRX cycles are within one outer cycle duration, and where different inner cycles may have different cycle durations. In some cases, an ON-duration offset value may be indicated for one or more DRX cycles within the DRX time period (e.g., via downlink control information (DCI) or a medium access control (MAC) control element (CE)). In some cases, the DRX time period may correspond to an anchor cycle that spans a set of DRX cycles, and a subset of the set of DRX cycles may have a different cycle duration than other DRX cycles of the set of DRX cycles within the DRX time period. In further cases, DRX cycles may be configured to have a cycle duration that corresponds to a rational number that is selected to correspond to the periodicity of the downlink traffic to the UE.

Such techniques may allow for relatively efficient communications between the UE and base station while providing relatively low power consumption at the UE. By aligning DRX ON-durations with expected periods of downlink traffic bursts from the base station, latency in communications may be reduced relative to instances where an initial downlink traffic burst is transmitted when the UE is in a sleep mode, which may necessitate one or more retransmissions of the traffic burst. Further, the UE may transition to the sleep mode between periodic traffic bursts, which may reduce power consumption relative to cases where the UE may not enter a sleep mode or where the UE may monitor for transmissions in an ON-duration that is not aligned with a traffic burst.

Aspects of the disclosure are initially described in the context of wireless communications systems. Additional aspects of the disclosure are described with respect to traffic patterns and DRX cycles. Aspects of the disclosure are further illustrated by and described with reference to apparatus diagrams, system diagrams, and flowcharts that relate to DRX techniques with non-uniform cycle durations.

FIG. 1 illustrates an example of a wireless communications system 100 that supports discontinuous reception techniques with non-uniform cycle durations in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

In some cases, one or more UEs 115 may be configured with DRX cycles within a DRX time period, such that different DRX cycles have non-uniform cycle durations within the DRX time period. Such non-uniform cycle durations may provide DRX ON-durations that are aligned with a periodicity of downlink traffic from a base station 105 to the UE 115. In some cases, the DRX time period may correspond to an anchor cycle that spans a set of DRX cycles, and a subset of the set of DRX cycles may have a different cycle duration than other DRX cycles of the set of DRX cycles. In some cases, an ON-duration offset value may be indicated for one or more DRX cycles within the DRX time period (e.g., via DCI or a MAC-CE). In other cases, multiple DRX configurations may be configured, including an outer cycle configuration having a cycle duration that corresponds to the DRX time period, and an inner cycle configuration in which a set of inner DRX cycles are within one outer cycle duration, and where different inner cycles may have different cycle durations. In further cases, DRX cycles may be configured to have a cycle duration that corresponds to a rational number that is selected to correspond to the periodicity of the downlink traffic to the UE 115.

Figure 2:
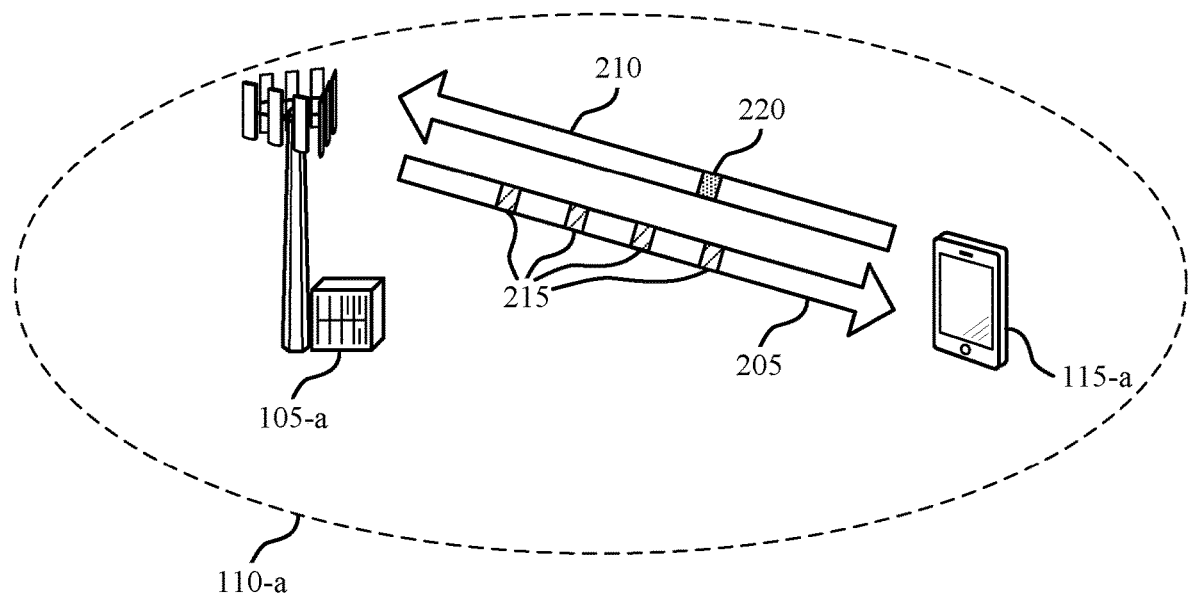
FIG. 2 illustrates an example of a portion of a wireless communications system that supports discontinuous reception techniques with non-uniform cycle durations in accordance with aspects of the present disclosure.

FIG. 2 illustrates an example of a wireless communications system 200 that supports discontinuous reception techniques with non-uniform cycle durations in accordance with aspects of the present disclosure. In some examples, wireless communications system 200 may implement aspects of wireless communications system 100. For example, the wireless communications system 200 may include a base station 105-*a* and a UE 115-*a*, which may be examples of the corresponding devices described with reference to FIG. 1. Some examples of the wireless communications system 200 may support DRX techniques with non-uniform cycle durations.

The base station 105-*a* may provide a network coverage for UE 115-*s* within geographic coverage area 110-*a*. In some examples, UE 115-*a* may support DRX operation for improved power efficiency. For example, a UE 115-*a* may operate according to a DRX configuration in which the UE 115-*a* monitors for communications during periodic ON-durations, and transitions to a low power sleep mode between the periodic ON-durations. The time period between the start of each ON-duration may be referred to as a cycle duration. Further, in some cases, DRX cycles may have an identified starting location (e.g., at the start of an identified slot within a subframe), and a configurable ON-duration (e.g., 2 slots) that starts at an offset (e.g., 4 slots) relative to the identified starting location.

For example, the base station 105-*a* and UE 115-*a* may establish one or more downlink channels 205 and one or more uplink channels 210. In this example, the UE 115-*a* may be running an application (e.g., an XR application) in which periodic traffic 215 may be transmitted to the UE 115-*a* from the base station 105-*a*. The UE 115-*a* may also transmit uplink traffic 220, which in some cases may also have periodic transmissions. In order to reduce power consumption, the UE 115-*a* may operate according to a DRX configuration in which the UE 115-*a* can transition to the low power sleep mode between bursts of periodic traffic 215. In accordance with various aspects of the present disclosure, the DRX configuration may have non-uniform cycle durations, such that the DRX ON-durations are aligned with expected timing of the periodic traffic 215. Various examples of periodic traffic and potential DRX configurations are discussed with reference to FIGS. 3 through 6.

Figure 3:
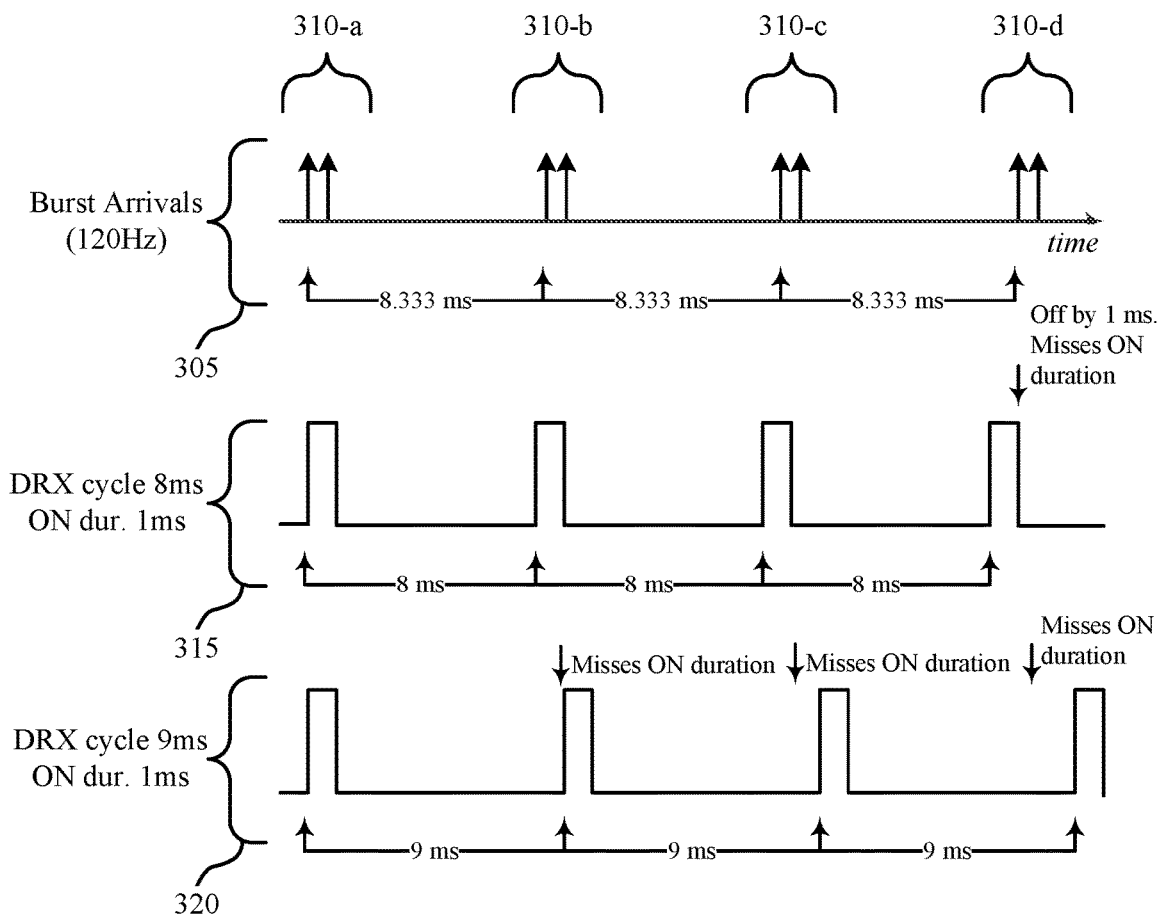
FIG. 3 illustrates an example of a downlink traffic pattern and DRX cycles that supports discontinuous reception techniques with non-uniform cycle durations in accordance with aspects of the present disclosure.

FIG. 3 illustrates an example of a downlink traffic pattern 300 that supports discontinuous reception techniques with non-uniform cycle durations in accordance with aspects of the present disclosure. In some examples, downlink traffic pattern 300 may be implemented in aspects of wireless communications system 100 or 200. In this example, downlink traffic burst arrivals 305 may include a number of downlink traffic bursts 310 that are transmitted according to a periodic pattern. Further, in this example, a first conventional DRX configuration 315 and a second conventional DRX configuration 320 are illustrated.

The downlink traffic bursts 310 may include, for example, XR downlink traffic that has a periodic pattern that corresponds to a frame rate of transmitted data (e.g., H.264/H.265 encoded video). Such downlink traffic may be quasi-periodic with burst a every frame at one frame-per-second (1/fps), or two possibly staggered "eye-buffers" per frame at 1/(2*fps). An update rate is may be, for example, 120 Hz or 60 Hz, thus resulting in a downlink traffic burst arrival periodicity of 8.333 ms or 16.667 ms, respectively. However, conventional DRX configuration may have one millisecond as the finest granularity for a DRX cycle, and the start of the ON duration may be aligned to millisecond time boundaries.

In the example of FIG. 3, a 120 Hz update rate is illustrated for burst arrivals 305, thus resulting in an 8.333 ms periodicity for the downlink traffic bursts 310. In the event that the first conventional DRX configuration 315 is selected and an initial DRX cycle has an ON-duration that is aligned with the first downlink traffic burst 310-a, the second downlink traffic burst 310-b and the third downlink traffic burst 310-a will each also be within the subsequent two ON-durations. However, the fourth downlink burst 310-d would miss the fourth ON-duration, as it would occur 0.333 seconds after the end of the fourth ON-duration. If the second conventional DRX configuration 320 were to be selected instead, the result would be that the first downlink traffic burst 310-a would be aligned with an ON-duration, but subsequent downlink traffic bursts 310-b, 310-c, and 310-d would each miss the ON-duration.

Further if the DRX configuration were to be modified to have a finest granularity corresponding to a slot or symbol, such misalignments would continue to occur due to the burst arrivals 305 having a periodicity that is not a multiple of a slot or symbol duration. For example, as the traffic burst interval (120 Hz or 60 Hz) expressed in milliseconds has a factor of 3 in the denominator which cannot divide into the numerator (i.e., 1000/120=X/3, where X is an integer such as 25 for a 120 Hz update rate or 50 for 60 Hz update rate). More generally, if DRX cycle granularity can be defined in slots, the expression would be $$\text{(num of slots in a second)/(source update rate in Hz)} = Y/3. \quad \text{(Equation 1)}$$

Additionally, misalignments between the downlink traffic bursts 310 and ON-durations may add additional latency to communications, where the additional latency is cyclic. For example, in a first missed ON-duration of an 8 ms DRX configuration, the downlink traffic burst may be retransmitted at a next ON-duration, which occurs 7 ms later than the missed ON-duration. Subsequent downlink traffic bursts will have a lower latency, which reduces by 0.333 ms each cycle, until the downlink traffic bursts are again aligned with ON-durations in 21 cycles, with such alignment lasting for three cycles. Thus, the alignment and misalignment of downlink traffic bursts in such an example would be cyclic with a period of 24 cycles, and an average latency of about 3 ms. In some cases, to reduce the latency, the DRX cycle duration may be reduced, which also has a corresponding increase in power consumption due to the extra ON-durations. Thus, non-uniform cycle durations in accordance with techniques discussed herein may allow for such misalignments to be reduced or eliminated, which may reduce latency for communications and reduce power consumption at UEs.

Figure 4:
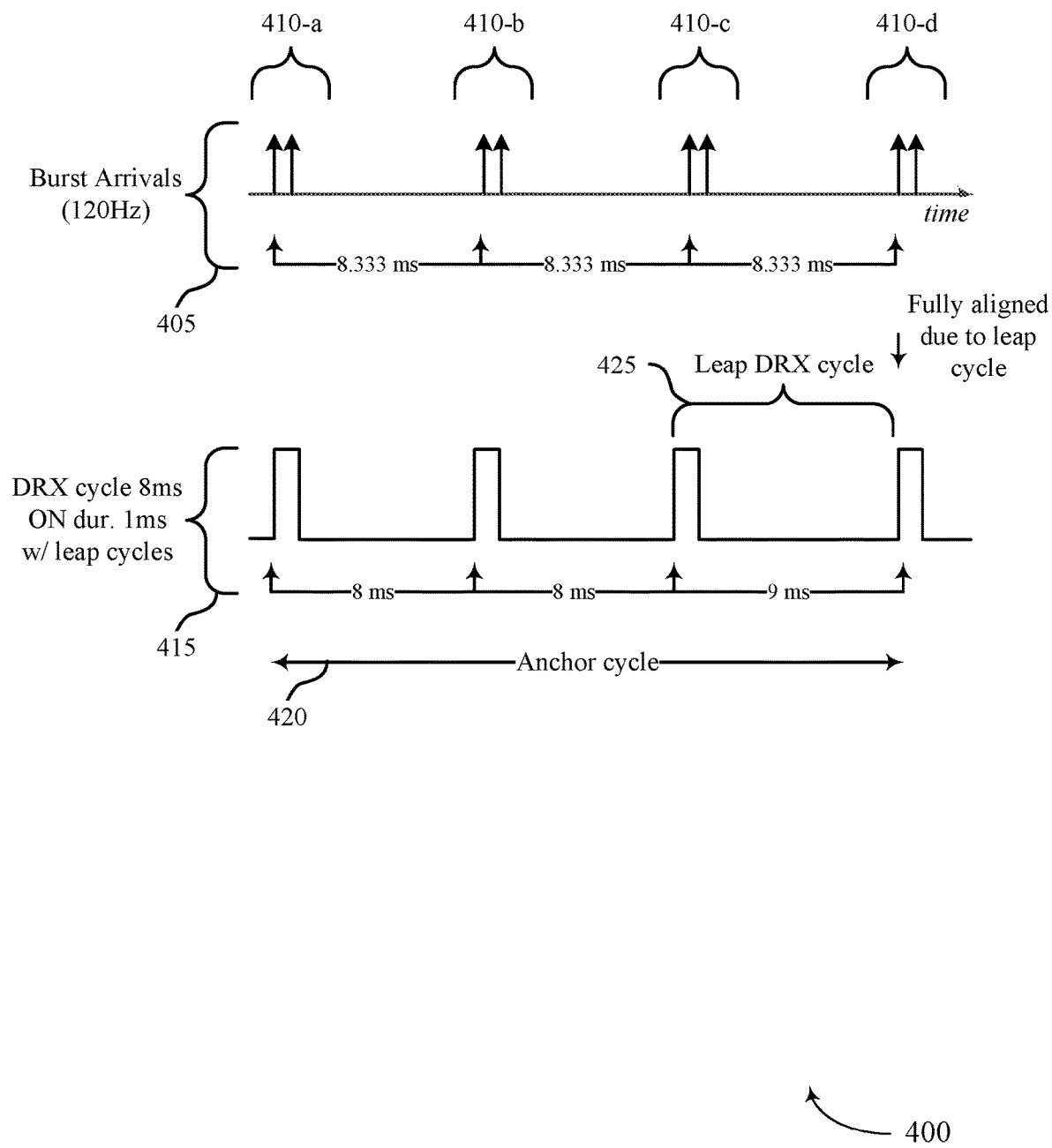
FIG. 4 illustrates an example of an anchor cycle with a leap DRX cycle that supports discontinuous reception techniques with non-uniform cycle durations in accordance with aspects of the present disclosure.

FIG. 4 illustrates an example of an anchor cycle with a leap DRX cycle 400 that supports discontinuous reception techniques with non-uniform cycle durations in accordance with aspects of the present disclosure. In some examples, anchor cycle with a leap DRX cycle 400 may implement aspects of wireless communications system 100 or 200. In this example, again, downlink traffic burst arrivals 405 may include a number of downlink traffic bursts 410 that are transmitted according to a periodic pattern. Further, in this example, a DRX configuration 415 with non-uniform cycle durations is illustrated.

The downlink traffic bursts 410 may include, for example, XR downlink traffic that has a periodic pattern with a downlink traffic bursts 410 every 8.333 ms. In this example, DRX configuration 415 may include an anchor cycle 420 that spans a number of DRX cycles. In this example, the anchor cycle 420 spans three DRX cycles, and the third DRX cycle is a leap cycle 425 that has a longer cycle duration than the initial two DRX cycles. In some cases, the anchor cycle 420, which may be an example of a discontinuous reception period, may span more or fewer DRX cycles, and may include one or more leap cycles 425. The anchor cycle 420 may be used as a basis for determining timing for radio resource management (RRM) functions. In some cases, the leap cycle 425 may include one or more additional slots than other DRX cycles of the anchor cycle 420. In some cases, the position of the leap cycle(s) 425 can be varied within the anchor cycle 420. While the example of FIG. 4 shows a burst arrivals 405 associated with periodic traffic having a 120 Hz update rate, and thus anchor cycle 420 includes three DRX cycles with durations of 8 ms, 8 ms, and 9 ms, other configurations may be used for different periodicities or patterns of downlink traffic. For example, for periodic traffic with a 60 Hz update rate, an anchor cycle with three DRX cycles of 16 ms, 17 ms, 17 ms may be configured, or the three DRX cycles may have durations of 16 ms, 16 ms, 18 ms, respectively. The order of the leap cycle(s) 425 among the DRX cycles within the anchor cycle 420 may also be configured. For example, for 120 Hz update rate, DRX cycles with duration of (8 ms, 8 ms, 9 ms), (8 ms, 9 ms, 8 ms), or (9 ms, 8 ms, 8 ms) can be configured. Support for such varied options in the ordering may help with offsetting multiple users in time for their respective ON durations, in order to better distribute utilization of resources over time.

In some cases, a base station may configure a UE with such a DRX configuration via radio resource control (RRC) signaling. For example, a base station may identify that periodic traffic is being transmitted to the UE (e.g., based on XR application traffic having a certain update rate, or based on historical downlink burst transmissions to the UE), and that the periodic traffic does not align with slot or subframe boundaries. The base station may determine the anchor cycle duration (e.g., based on a number of periods of the downlink traffic bursts 410 that correspond to millisecond time boundaries, such as three 8.333 ms periods that provide a 25 ms anchor cycle duration), a number of DRX cycles within the anchor cycle 420, and which of the DRX cycles are to have different cycle durations. In some cases, the RRC signaling may indicate the anchor cycle duration in milliseconds, the number of DRX cycles in the anchor cycle, and the cycle duration of each DRX cycle (e.g., 8, 8, 9). In some cases, the UE may signal to the base station that the UE has a capability to perform DRX procedures with non-uniform DRX cycles, and the base station may enable the capability when providing the DRX configuration. In other cases, non-uniform DRX cycles may be configured using other techniques, such as by adjusting a starting offset of an ON-duration of a DRX cycle, as discussed in the example of FIG. 5.

Figure 5:
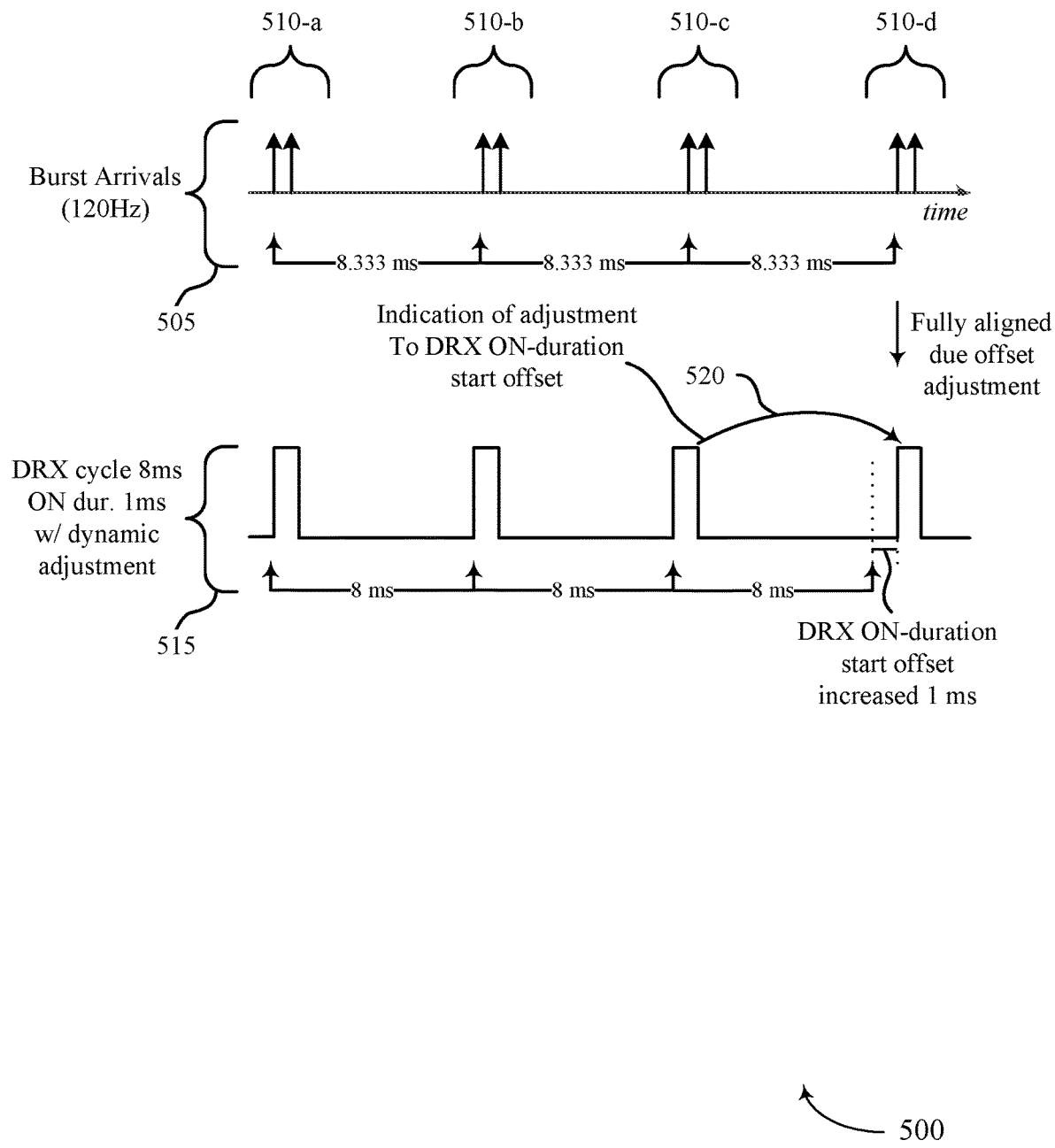
FIG. 5 illustrates an example of a DRX configuration with dynamic offset adjustment that supports discontinuous reception techniques with non-uniform cycle durations in accordance with aspects of the present disclosure.

FIG. 5 illustrates an example of a DRX configuration with dynamic offset adjustment 500 that supports discontinuous reception techniques with non-uniform cycle durations in accordance with aspects of the present disclosure. In some examples, DRX configuration with dynamic offset adjustment 500 may implement aspects of wireless communications system 100 or 200. In this example, again, downlink traffic burst arrivals 505 may include a number of downlink traffic bursts 510 that are transmitted according to a periodic pattern. Further, in this example, a DRX configuration 515 with non-uniform cycle durations is illustrated.

The downlink traffic bursts 510 may include, for example, XR downlink traffic that has a periodic pattern with a downlink traffic bursts 510 every 8.333 ms. In this example, DRX configuration 515 have a configuration with an 8 ms DRX cycle duration and a 1 ms ON-duration. In the initial DRX cycles where the downlink traffic bursts 510 the ON-duration may have a zero millisecond offset, such that the first downlink traffic burst 510-a, the second downlink traffic burst 510-b, and the third downlink traffic burst 510-c are aligned with ON-durations. In this example, an adjustment 520 to the DRX ON-duration start offset may be made following the third downlink burst 510-c, which may increase the ON-duration start offset by one millisecond in this example, such that the adjusted DRX ON-duration is aligned with the fourth downlink traffic burst 510-d. In some cases, another adjustment to the ON-duration offset back to the original offset may be made following the fourth downlink traffic burst 510-d, and the DRX cycles may configure in such a manner, so as to provide aligned ON-durations with downlink traffic bursts 510.

In some cases, the DRX ON-duration start offset adjustment can be predefined based on a specification, or defined in the DRX configuration (e.g., that is provided in RRC signaling). For example, different types of traffic (e.g., XR traffic) and different periodicities (e.g., based on a 120 Hz or 60 Hz update rate) DRX starting offsets may be defined according to a pattern such as in FIG. 5 (e.g., every 4th DRX cycle has a 1 ms starting offset added). In some cases, the DRX starting offset may be dynamically indicated (e.g. based on MAC-CE or DCI) in a prior downlink transmission.

Figure 6:
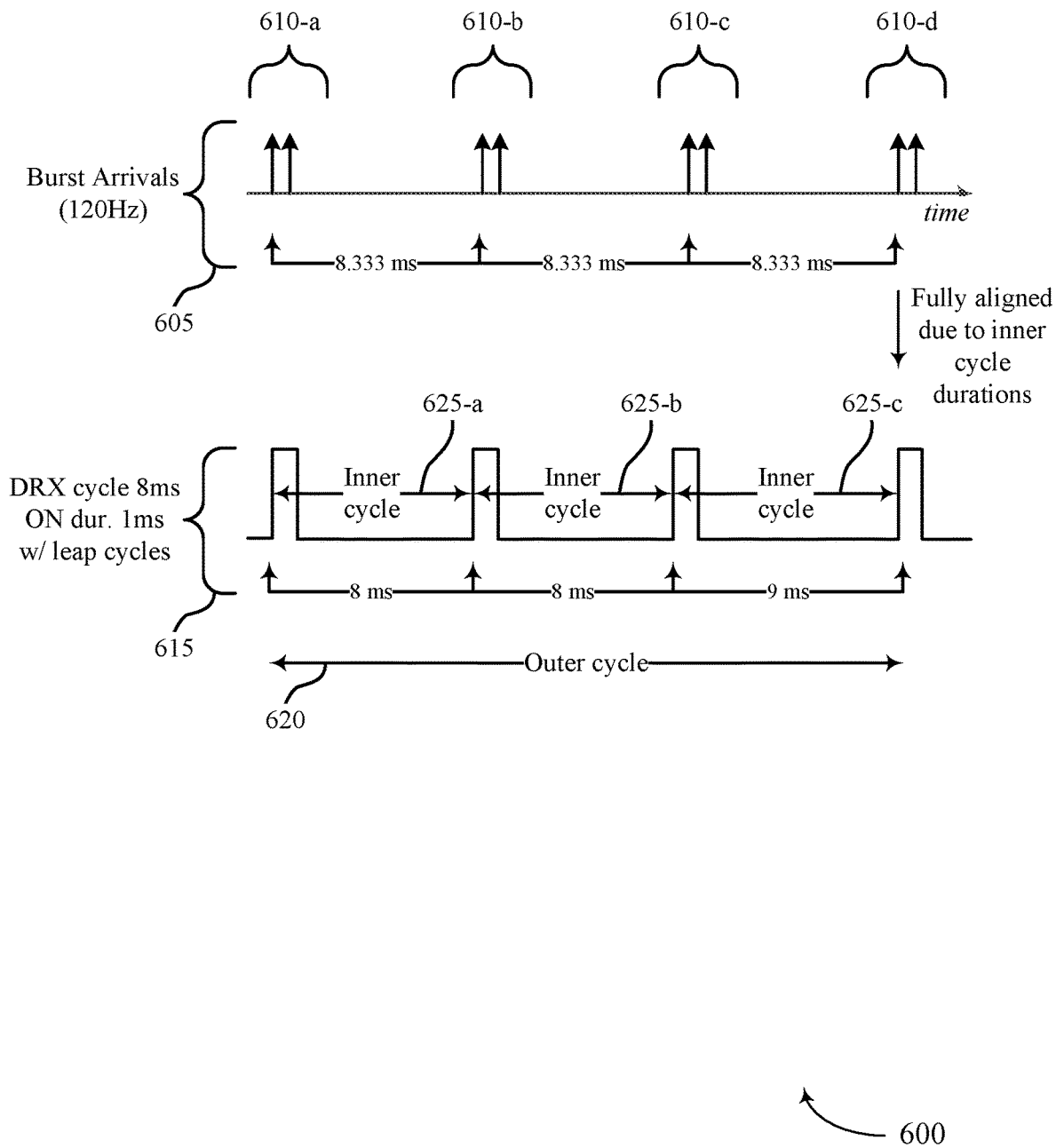
FIG. 6 illustrates an example of DRX outer and inner cycles that support discontinuous reception techniques with non-uniform cycle durations in accordance with aspects of the present disclosure.

In further cases, non-uniform DRX cycle durations may be configured through separate outer and inner DRX configurations. FIG. 6 illustrates an example of DRX outer and inner cycles 600 that supports discontinuous reception techniques with non-uniform cycle durations in accordance with aspects of the present disclosure. In some examples, DRX outer and inner cycles 600 may implement aspects of wireless communications system 100 or 200. In this example, again, downlink traffic burst arrivals 605 may include a number of downlink traffic bursts 610 that are transmitted according to a periodic pattern. Further, in this example, a DRX configuration 615 with non-uniform cycle durations is illustrated.

The downlink traffic bursts 610 may include, for example, XR downlink traffic that has a periodic pattern with a downlink traffic bursts 610 every 8.333 ms. In this example, non-uniform DRX cycle durations may be configured by providing an outer cycle 620 configuration and an inner cycle 625 configuration. The outer cycle 620, which may be an example of a discontinuous reception cycle that has a period equal to a discontinuous reception period, may span more or fewer DRX cycles than illustrated in FIG. 6. The outer cycle 620 configuration may be used as a basis for determining timing for RRM functions (e.g., reference signal transmissions and measurements that provide information on channel conditions between the UE and base station).

The inner cycle 625 configuration may provide configurations for a set of DRX cycles within each outer cycle 620. In this example, a first inner cycle 625-a may be configured with a first cycle duration (e.g., 8 ms), a second inner cycle 625-b may be configured with the first cycle duration, and a third inner cycle 625-c may be configured with a second cycle duration (e.g., 9 ms). In some cases, the position of the longer inner cycle 625 can be varied within the outer cycle 620. While the example of FIG. 6 shows a burst arrivals 605 associated with periodic traffic having a 120 Hz update rate, and thus outer cycle 620 includes three inner DRX cycles 625 with durations of 8 ms, 8 ms, and 9 ms, other configurations may be used for different periodicities or patterns of downlink traffic. For example, for periodic traffic with a 60 Hz update rate, an outer cycle 620 with three inner DRX cycles 625 of 16 ms, 17 ms, 17 ms may be configured, or the three DRX cycles may have durations of 16 ms, 16 ms, 18 ms, respectively. In some examples, the configuration of the inner DRX cycles 625 may be communicated or identified by one or more additional ON-durations included within an outer cycle 620.

In some cases, a base station may configure a UE with such DRX configurations via radio resource control (RRC) signaling. For example, a base station may identify that periodic traffic is being transmitted to the UE (e.g., based on XR application traffic having a certain update rate, or based on historical downlink burst transmissions to the UE), and that the periodic traffic does not align with slot or subframe boundaries. The base station may determine the outer cycle 620 configuration (e.g., based on a number of periods of the downlink traffic bursts 610 that correspond to millisecond time boundaries, such as three 8.333 ms periods that provide a 25 ms outer cycle 620 duration), a number of inner DRX cycles 625 within the outer cycle 620, and which of the inner DRX cycles 625 are to have different cycle durations. In some cases, the RRC signaling may configure the outer cycle 620 as a separate DRX configuration, and configure the inner cycles 625 as a separate DRX configuration, where RRM is performed based on the outer cycle 620 configuration. In some cases, the start of an initial inner cycle 625-a is aligned to the start of the outer cycle 620, and the end of the last inner cycle 625-c is aligned to the end of the outer cycle 620. The ON-duration, inactivity timer, and other DRX parameter configuration for the inner cycles 625 may be the same as that of the outer cycle 620. In some cases, the UE may signal to the base station that the UE has a capability to perform DRX procedures with non-uniform DRX cycles, and the base station may enable the capability when providing the DRX configuration.

In other cases, DRX cycle durations may be configured based on a rational number that is used to determine the DRX cycle durations. In such cases, instead of supporting only integer millisecond DRX cycle durations, a DRX configuration may support non-integer millisecond DRX cycle durations as a rational number. For example, the DRX cycle duration may be determined as p/q milliseconds, where p may be the period of multiple downlink bursts that provide an integer millisecond duration (e.g., for a 120 Hz update rate of XR traffic, 25 ms), and q may be the inverse a decimal portion of the downlink burst period (e.g., 1/0.333=3, for a 120 Hz update rate of XR traffic). Based on the rational number cycle duration, DRX cycles may start in a middle of a slot. Based on the starting point of the DRX cycle, the associated ON-duration may be quantized, in some cases, to start at a slot/mini-slot boundary of the current active bandwidth part. In some cases, the starting point of the ON-duration may be set to the nearest boundary, to a next boundary in time, or to a previous boundary in time. In other cases, the start of the ON duration may be quantized to a symbol boundary of the current active bandwidth part, such as to a nearest symbol boundary, a next symbol boundary, or a previous symbol boundary. In such cases, the ON-duration may be defined in terms of a number of symbols. In further cases, the ON-duration starting location may not be quantized to a time boundary, and an absolute time is used to determine the start of the ON-duration.

In such configurations, downlink control channel monitoring occasion start and end times may be compared to ON-duration timing, and if the monitoring occasion falls entirely within an ON-duration, the control channel monitoring occasion will be monitored. Further, in some cases a DRX inactivity timer may be applied based on the ON-durations. The DRX activity timer may have a granularity of milliseconds or fractional-slots. In some cases, the DRX activity timer may be applied based on absolute time relative to the ON-duration. In other cases, the DRX activity timer may be first based on an absolute time relative to the ON-duration, and then a quantization applies (e.g., to align with a slot, mini-slot, or symbol). Further, in such rational number-based cycle duration configurations, various other operations (e.g., RRM), may be anchored to certain DRX cycles, such as every p-th cycle.

Figure 7:
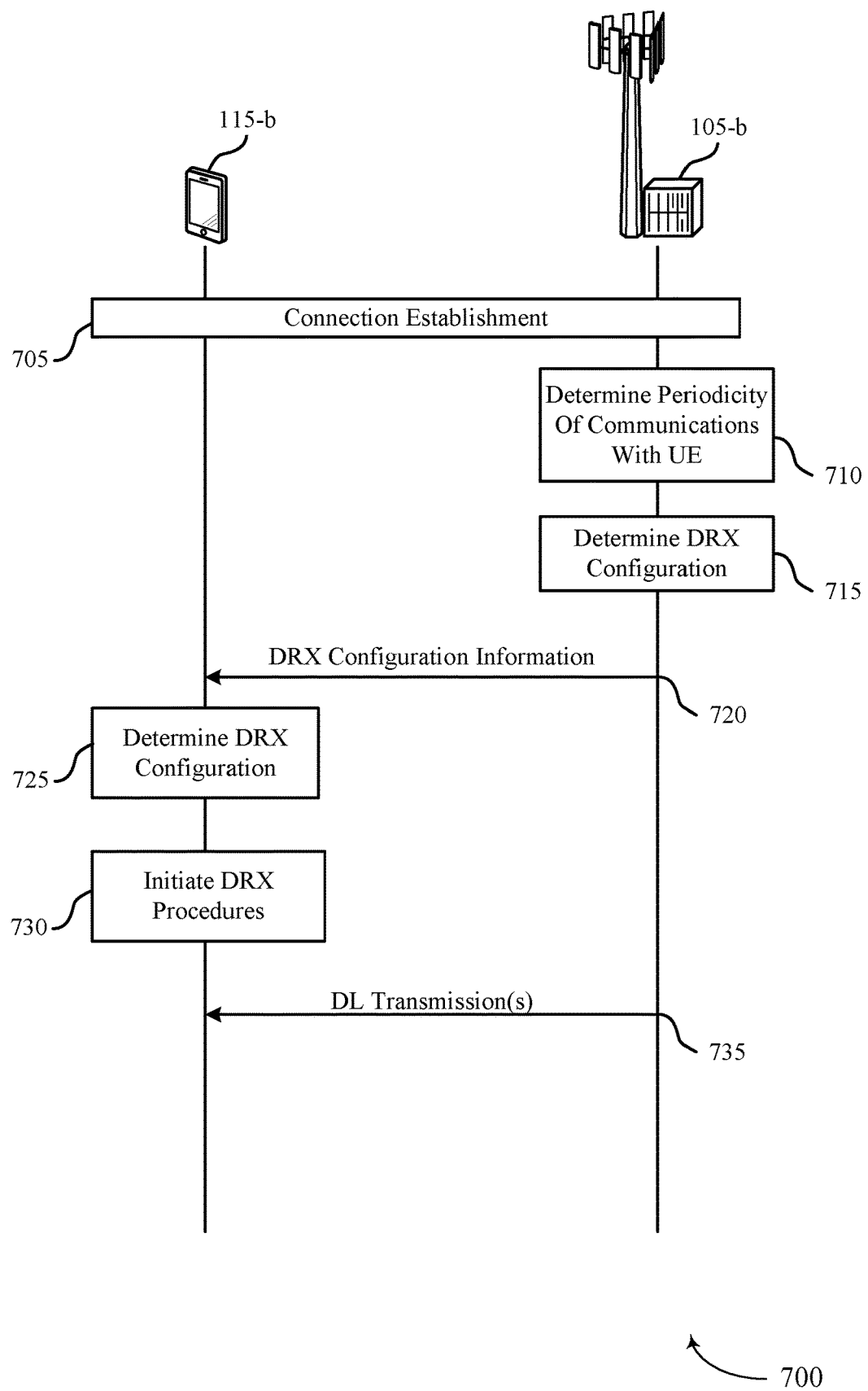
FIG. 7 illustrates an example of a process flow that supports discontinuous reception techniques with non-uniform cycle durations in accordance with aspects of the present disclosure.

FIG. 7 illustrates an example of a process flow 700 that supports discontinuous reception techniques with non-uniform cycle durations in accordance with aspects of the present disclosure. The process flow 700 may include a base station 105-*b* and a UE 115-*b*, which may be examples of the corresponding devices described with reference to FIGS. 1 through 6. In some examples, the process flow 700 may implement aspects of the wireless communications systems 100 and 200. For example, the base station 105-*b* and the UE 115-*b* may support DRX operations with non-uniform cycle durations.

In the following description of the process flow 700, the operations between the base station 105-*b* and the UE 115-*b* may be transmitted in a different order than the exemplary order shown, or the operations performed by the base station 105-*b* and the UE 115-*b* may be performed in different orders or at different times. Certain operations may also be left out of the process flow 700, or other operations may be added to the process flow 700.

The process flow 700 may, in some examples, commence at 705 with the base station 105-*b* establishing a connection with the UE 115-*b* (e.g., performing a cell acquisition procedure, a random access procedure, an RRC connection procedure, an RRC configuration procedure).

At 710, the base station 105-*b* may determine a periodicity of communications with the UE 115-*b*. For example, the base station 105-*b* may determine that downlink traffic bursts are transmitted to the UE 115-*b* (e.g., XR application transmissions) according to the periodicity. In some cases, the base station 105-*b* may identify that the traffic is associated with a particular application (e.g., based on signaling from the UE 115-*b* that indicates the application is being used) and determine the periodicity based on the application (e.g., a burst periodicity based on a video refresh rate of the application). In other cases, the base station 105-*b* may identify that periodic traffic is transmitted to the UE 115-*b* over a period of time, and based on this historical information may determine the periodicity of communications.

At 715, the base station 105-*b* may determine a DRX configuration for the UE 115-*b*. In some cases, the base station 105-*b* may determine the DRX configuration to provide ON-durations at the UE 115-*b* that correspond with the determined traffic periodicity, which may reduce latency at the UE 115-*b* and also reduce power consumption at the UE 115-*b*. In some cases, the DRX configuration may have non-uniform cycle durations. in such cases, the base station may configure a discontinuous reception period (e.g., an anchor cycle, outer cycle, number of DRX cycles prior to an ON-duration offset adjustment, or number of DRX cycles). Within the discontinuous reception period, one or more DRX cycles may have a first cycle duration, and one or more other DRX cycles may have a second cycle duration, which may provide that the ON-durations are aligned with the downlink traffic bursts.

At 720, the base station 105-*b* may transmit DRX configuration information to the UE 115-*b*. In some cases, the DRX configuration may be provided in RRC signaling. In some cases, as part of the connection establishment, the UE 115-*b* may indicate a capability for non-uniform DRX configurations, and the base station 105-*b* may enable this capability with the DRX configuration information. Additionally or alternatively, all or part of the DRX configuration information may be provided in DCI or in one or more MAC-CEs.

At 725, the UE 115-*b* may determine the DRX configuration. In some cases, the UE 115-*b* may determine the DRX configuration based on RRC signaling from the base station 105-*b*. At 730, the UE 115-*b* may initiate DRX procedures based on the DRX configuration. Such DRX procedures may include the UE 115-*b* transitioning to a sleep mode between ON-durations, and transitioning to an awake mode to monitor for downlink transmissions 735 from the base station 105-*b* during ON-durations. In some cases, DRX cycle durations may be non-uniform to accommodate downlink burst transmissions that occur at non-integer millisecond periods, in accordance with various techniques discussed herein.

Figure 8:
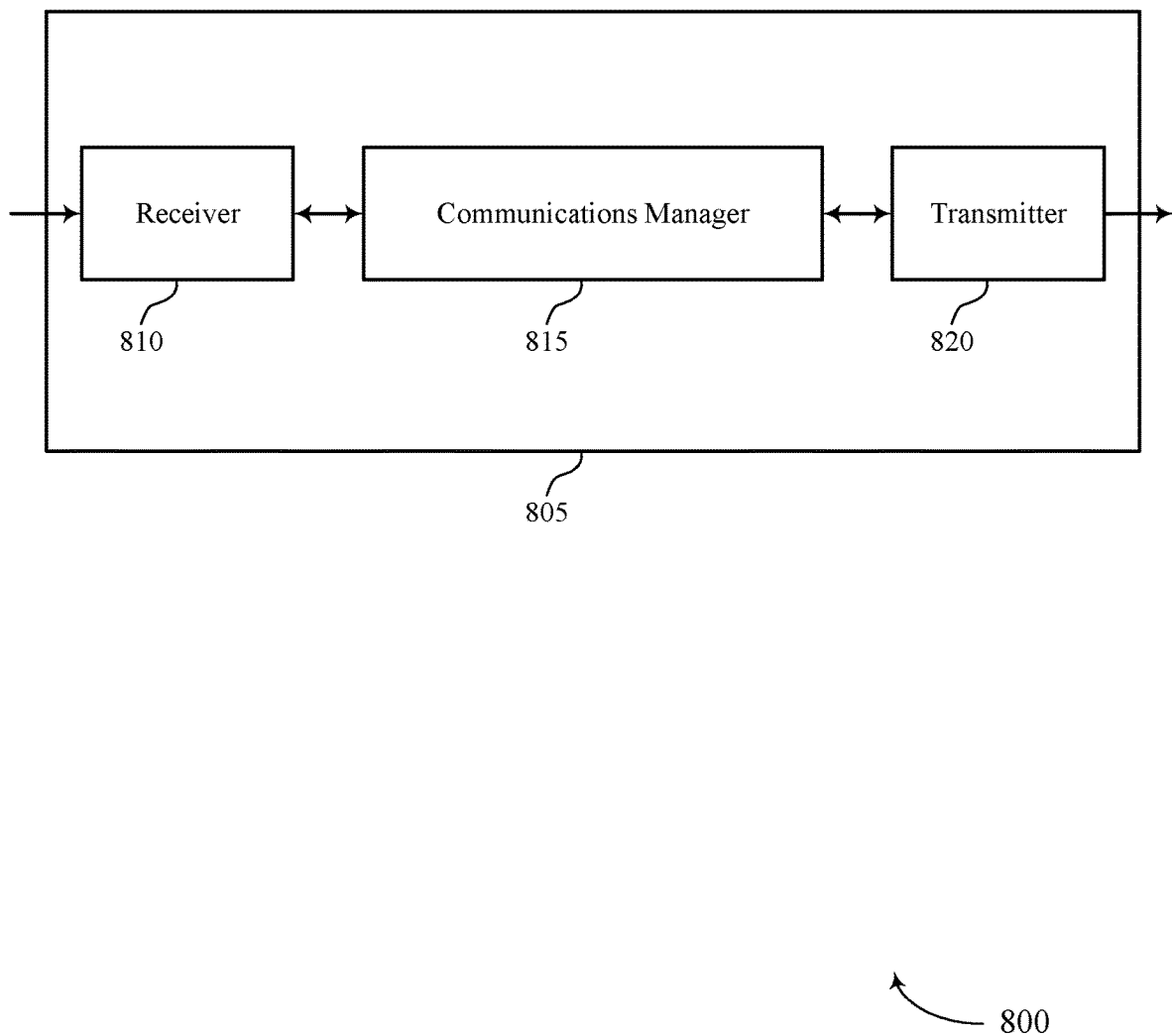
FIGS. 8 and 9 show block diagrams of devices that support discontinuous reception techniques with non-uniform cycle durations in accordance with aspects of the present disclosure.

FIG. 8 shows a block diagram 800 of a device 805 that supports discontinuous reception techniques with non-uniform cycle durations in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to discontinuous reception techniques with non-uniform cycle durations, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive a discontinuous reception cycle configuration from a base station that indicates a set of discontinuous reception cycles within a discontinuous reception period that each have an ON-duration during which the UE is to wake up from a sleep mode to monitor for transmissions from the base station, and where the UE transitions to the sleep mode after one or more of the ON-durations until the start of a subsequent ON-duration, determine, based on the discontinuous reception cycle configuration, a set of start times for the set of ON-durations within the discontinuous reception period, where at least one of the set of discontinuous reception cycles has a different cycle duration than other of the set of discontinuous reception cycles, and initiate a wakeup procedure for the UE at each of the set of start times based on the determining. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
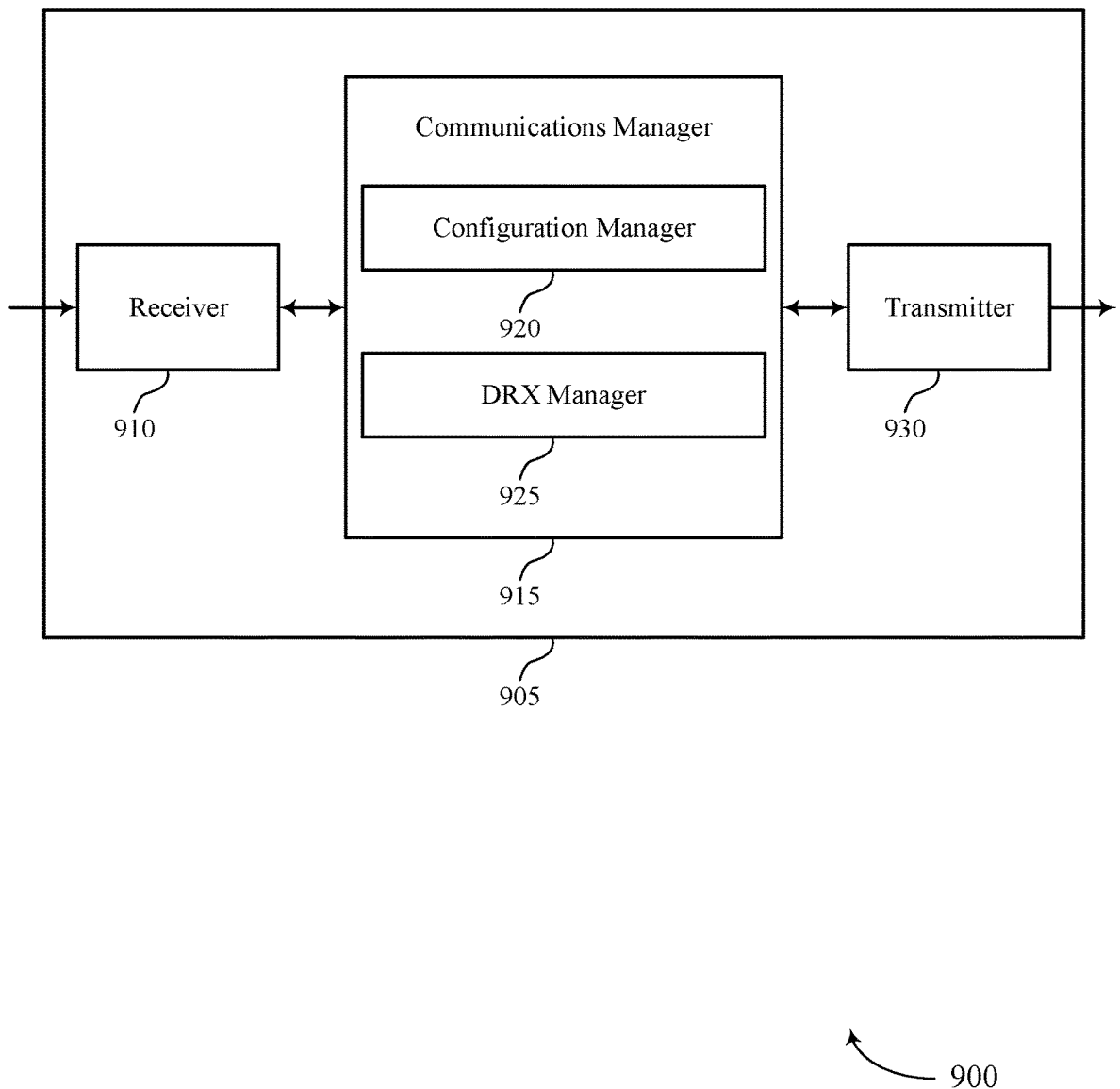

FIG. 9 shows a block diagram 900 of a device 905 that supports discontinuous reception techniques with non-uniform cycle durations in accordance with aspects of the present disclosure. The device 905 may be an example of aspects of a device 805, or a UE 115 as described herein. The device 905 may include a receiver 910, a communications manager 915, and a transmitter 930. The device 905 may also include a processor. Each of these components may be in communication with one another (e.g., via one or more buses).

The receiver 910 may receive information such as packets, user data, or control information associated with various information channels (e.g., control channels, data channels, and information related to discontinuous reception techniques with non-uniform cycle durations, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a configuration manager 920 and a DRX manager 925. The communications manager 915 may be an example of aspects of the communications manager 1110 described herein.

The configuration manager 920 may receive a discontinuous reception cycle configuration from a base station that indicates a set of discontinuous reception cycles within a discontinuous reception period that each have an ON-duration during which the UE is to wake up from a sleep mode to monitor for transmissions from the base station, and where the UE transitions to the sleep mode after one or more of the ON-durations until the start of a subsequent ON-duration.

The DRX manager 925 may determine, based on the discontinuous reception cycle configuration, a set of start times for the set of ON-durations within the discontinuous reception period, where at least one of the set of discontinuous reception cycles has a different cycle duration than other of the set of discontinuous reception cycles and initiate a wakeup procedure for the UE at each of the set of start times based on the determining.

The transmitter 930 may transmit signals generated by other components of the device 905. In some examples, the transmitter 930 may be collocated with a receiver 910 in a transceiver module. For example, the transmitter 930 may be an example of aspects of the transceiver 1120 described with reference to FIG. 11. The transmitter 930 may utilize a single antenna or a set of antennas.

Figure 10:
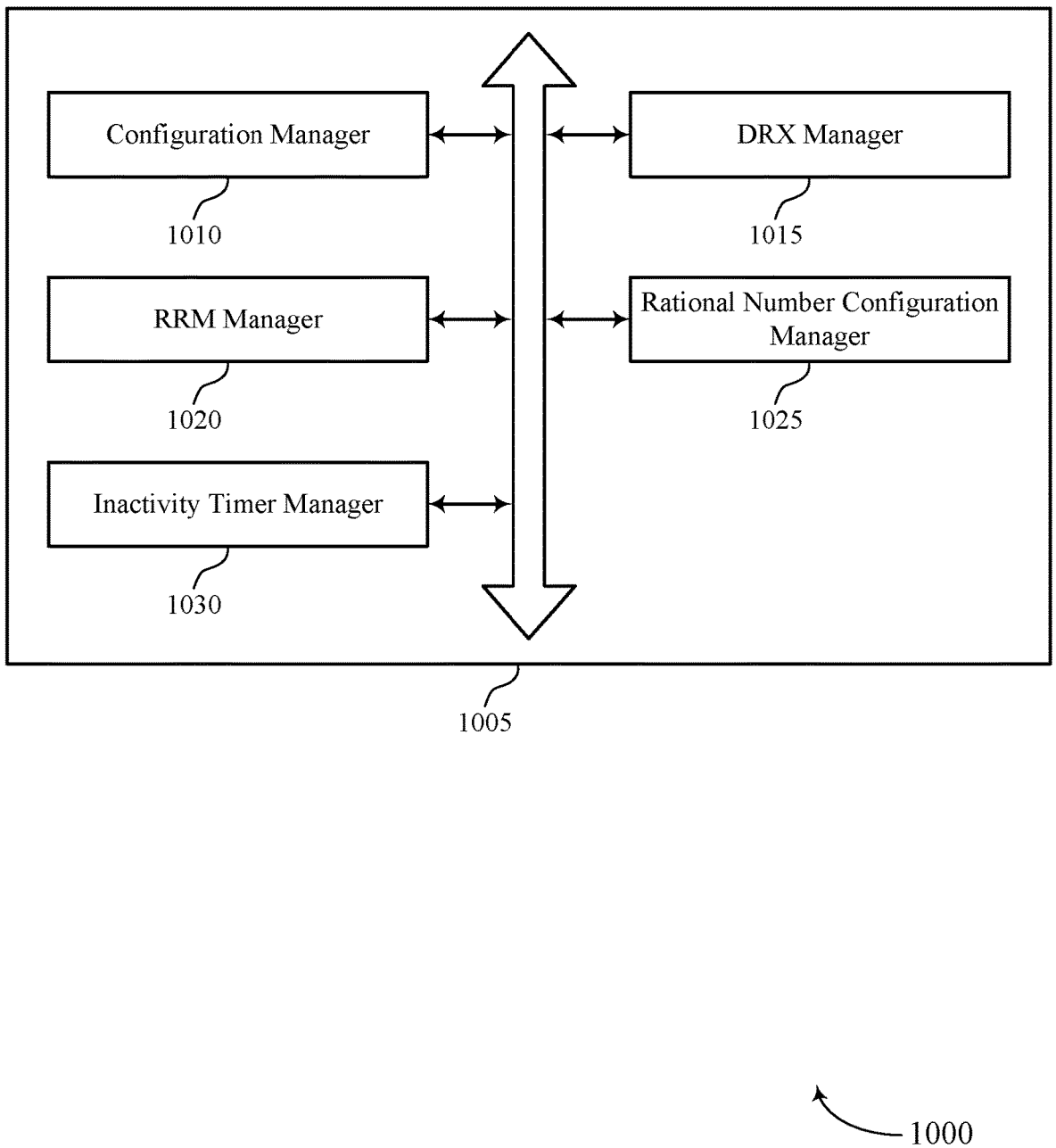
FIG. 10 shows a block diagram of a communications manager that supports discontinuous reception techniques with non-uniform cycle durations in accordance with aspects of the present disclosure.

FIG. 10 shows a block diagram 1000 of a communications manager 1005 that supports discontinuous reception techniques with non-uniform cycle durations in accordance with aspects of the present disclosure. The communications manager 1005 may be an example of aspects of a communications manager 815, a communications manager 915, or a communications manager 1110 described herein. The communications manager 1005 may include a configuration manager 1010, a DRX manager 1015, a RRM manager 1020, a rational number configuration manager 1025, and an inactivity timer manager 1030. Each of these modules may communicate, directly or indirectly, with one another (e.g., via one or more buses).

The configuration manager 1010 may receive a discontinuous reception cycle configuration from a base station that indicates a set of discontinuous reception cycles within a discontinuous reception period that each have an ON-duration during which the UE is to wake up from a sleep mode to monitor for transmissions from the base station, and where the UE transitions to the sleep mode after one or more of the ON-durations until the start of a subsequent ON-duration.

In some examples, the configuration manager 1010 may receive an indication of an anchor cycle that corresponds to the discontinuous reception period and that spans the set of discontinuous reception cycles and the cycle duration associated with each discontinuous reception cycle of the set of discontinuous reception cycles. In some examples, the configuration manager 1010 may receive radio resource control signaling that indicates the anchor cycle, a number of discontinuous reception cycles within the anchor cycle, and the cycle duration of each of the discontinuous reception cycles.

In some examples, the configuration manager 1010 may receive an indication of the cycle duration for each of the set of discontinuous reception cycles, a first starting offset for a first ON-duration within at least a first discontinuous reception cycle of the set of discontinuous reception cycles, and a second starting offset for a second ON-duration within at least a second discontinuous reception cycle of the set of discontinuous reception cycles, where the first starting offset is different than the second starting offset.

In some examples, the configuration manager 1010 may receive an outer discontinuous reception cycle configuration that indicates a first duration of an outer discontinuous reception cycle, where each outer discontinuous reception cycle has a same first duration that corresponds to the discontinuous reception period. In some examples, the configuration manager 1010 may receive an inner discontinuous reception cycle configuration that indicates two or more inner discontinuous reception cycles within each outer discontinuous reception cycle and where the cycle duration is associated with each inner discontinuous reception cycle, where at least one of the inner discontinuous reception cycles has a different cycle duration than other of the inner discontinuous reception cycles.

The DRX manager 1015 may determine, based on the discontinuous reception cycle configuration, a set of start times for the set of ON-durations within the discontinuous reception period, where at least one of the set of discontinuous reception cycles has a different cycle duration than other of the set of discontinuous reception cycles. In some examples, the DRX manager 1015 may initiate a wakeup procedure for the UE at each of the set of start times based on the determining. In some cases, the discontinuous reception cycle configuration includes a first discontinuous reception cycle duration for a first subset of the set of discontinuous reception cycles and a second discontinuous reception cycle duration for one or more leap cycles of the set of discontinuous reception cycles. In some cases, one or more of the first starting offset or the second starting offset is a predetermined starting offset or is signaled by the base station. In some cases, one or more of the first starting offset or the second starting offset is signaled by the base station in one or more of DCI or a MAC-CE. In some cases, a start of an initial inner discontinuous reception cycle is aligned with a start of an outer discontinuous reception cycle, and an end of a last discontinuous reception cycle is aligned with an end of the outer discontinuous reception cycle.

The RRM manager 1020 may perform various RRM procedures at the UE. In some cases, one or more RRM procedures are performed based on the anchor cycle. In some cases, one or more RRM procedures are performed based on the outer discontinuous reception cycle configuration.

The rational number configuration manager 1025 may receive an indication of a rational number that indicates a duration associated with each discontinuous reception cycle within the discontinuous reception period. In some examples, the rational number configuration manager 1025 may adjust the start time of each of the set of ON-durations to align with a timing boundary used for wireless communications between the UE and the base station. In some cases, the start time of each of the set of ON-durations is adjusted to align with a nearest timing boundary, a next timing boundary, or a previous timing boundary. In some cases, the timing boundary is a slot boundary or a symbol boundary.

The inactivity timer manager 1030 may initiate a discontinuous reception cycle inactivity timer based on an absolute time relative to each ON-duration or adjusted ON-duration.

Figure 11:
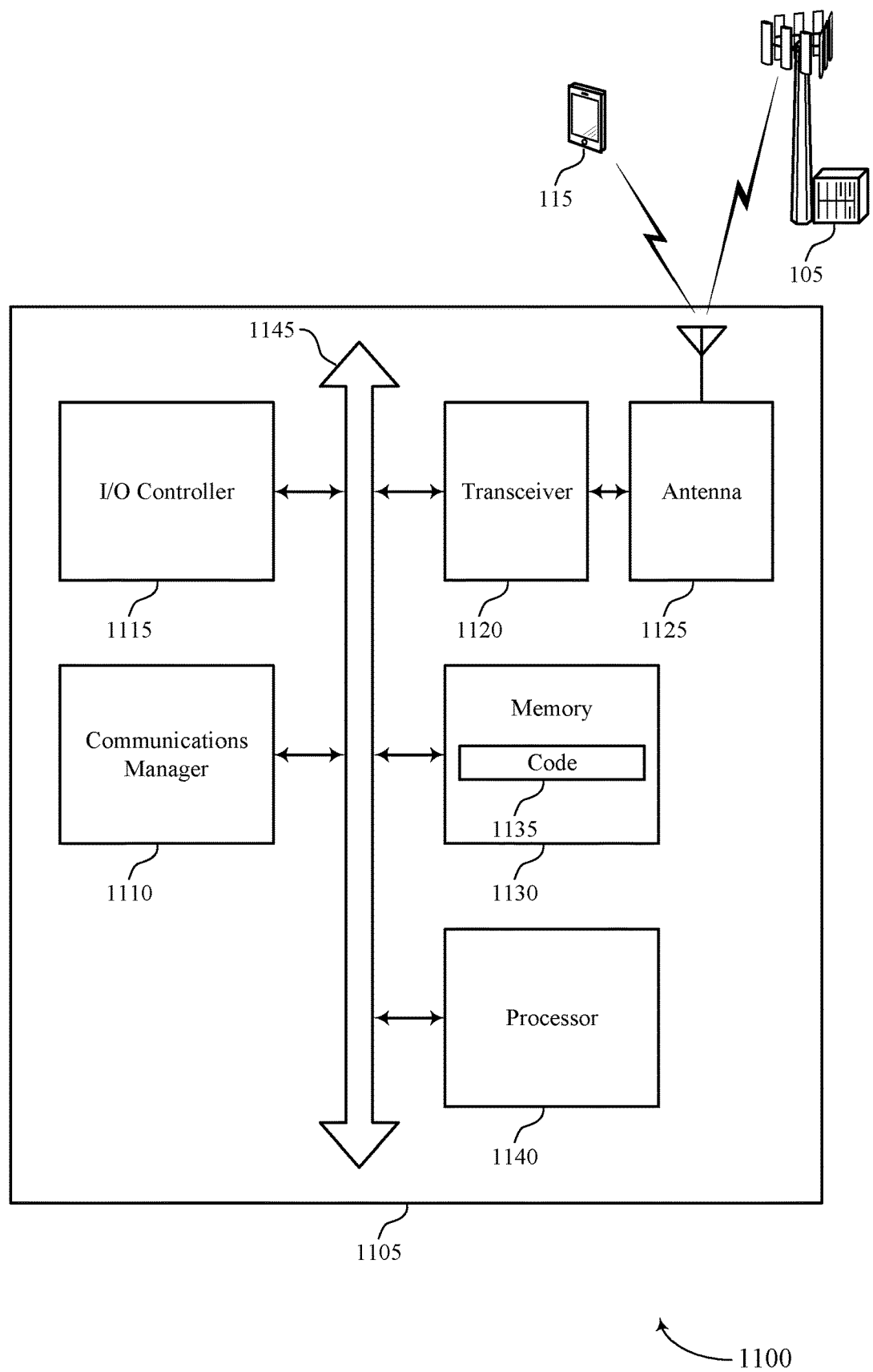
FIG. 11 shows a diagram of a system including a device that supports discontinuous reception techniques with non-uniform cycle durations in accordance with aspects of the present disclosure.

FIG. 11 shows a diagram of a system 1100 including a device 1105 that supports discontinuous reception techniques with non-uniform cycle durations in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive a discontinuous reception cycle configuration from a base station that indicates a set of discontinuous reception cycles within a discontinuous reception period that each have an ON-duration during which the UE is to wake up from a sleep mode to monitor for transmissions from the base station, and where the UE transitions to the sleep mode after one or more of the ON-durations until the start of a subsequent ON-duration, determine, based on the discontinuous reception cycle configuration, a set of start times for the set of ON-durations within the discontinuous reception period, where at least one of the set of discontinuous reception cycles has a different cycle duration than other of the set of discontinuous reception cycles, and initiate a wakeup procedure for the UE at each of the set of start times based on the determining.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting discontinuous reception techniques with non-uniform cycle durations).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

In some implementations, one or more integrated circuits (e.g., transceivers, processors, etc.) of the device 1105 may implement non-uniform cycle durations in accordance with techniques discussed herein thereby allowing for misalignments to be reduced or eliminated. Beneficially, latency for communications by the device 1105 may be reduced and power consumption by the one or more integrated circuits as well as the device 1105 overall may be reduced.

Figure 12:
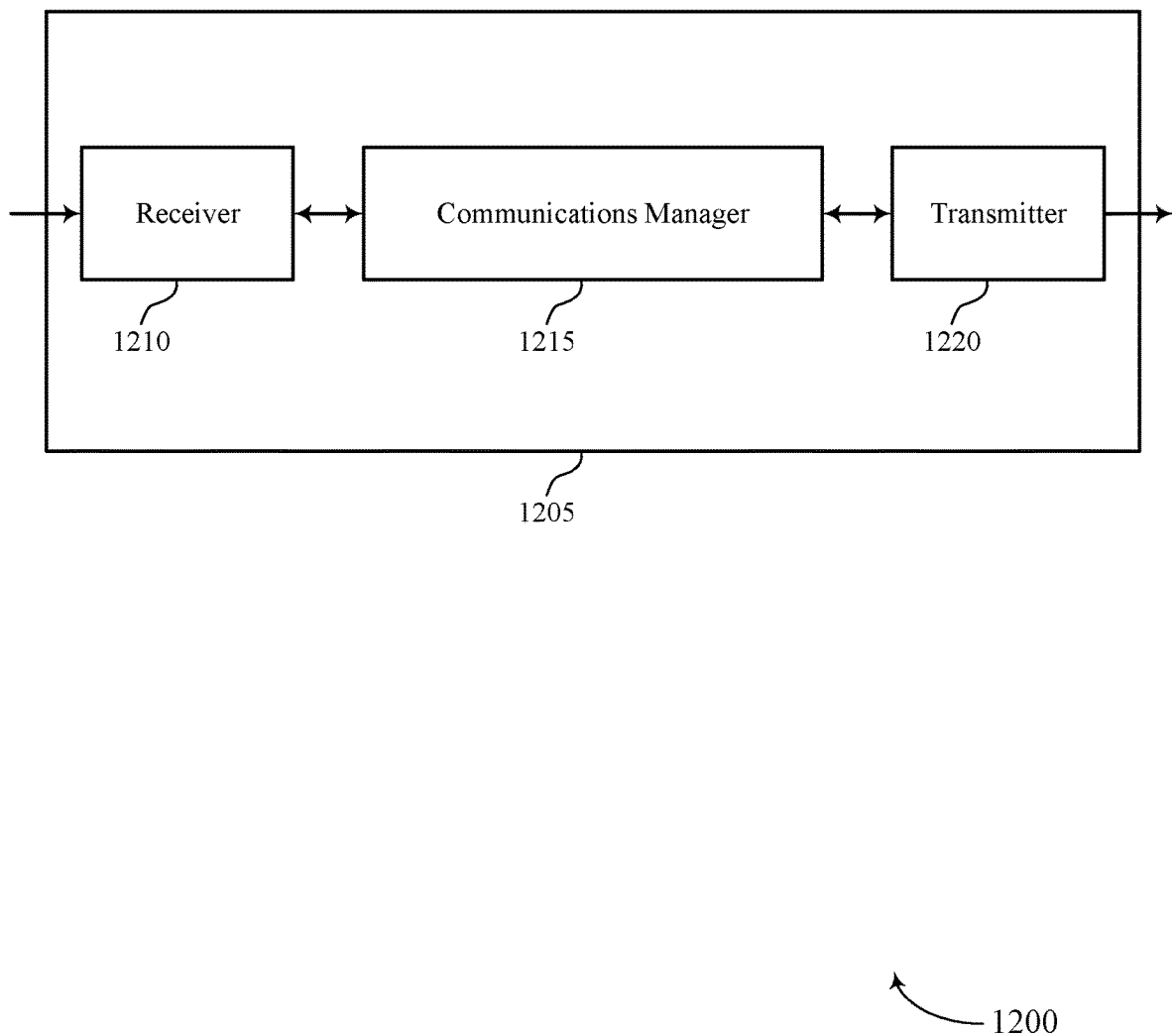
FIGS. 12 and 13 show block diagrams of devices that support discontinuous reception techniques with non-uniform cycle durations in accordance with aspects of the present disclosure.

FIG. 12 shows a block diagram 1200 of a device 1205 that supports discontinuous reception techniques with non-uniform cycle durations in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to discontinuous reception techniques with non-uniform cycle durations, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may identify a traffic periodicity for wireless communications traffic that is transmitted to a UE, determine, based on the traffic periodicity, a discontinuous reception cycle configuration for the UE that indicates a set of discontinuous reception cycles within a discontinuous reception period that each have an ON-duration during which the UE is to wake up from a sleep mode to monitor for transmissions from the base station, where the UE transitions to the sleep mode after one or more of the ON-durations until the start of a subsequent ON-duration, and where at least one of the set of discontinuous reception cycles has a different cycle duration than other of the set of discontinuous reception cycles within the discontinuous reception period, and transmit the discontinuous reception cycle configuration to the UE. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
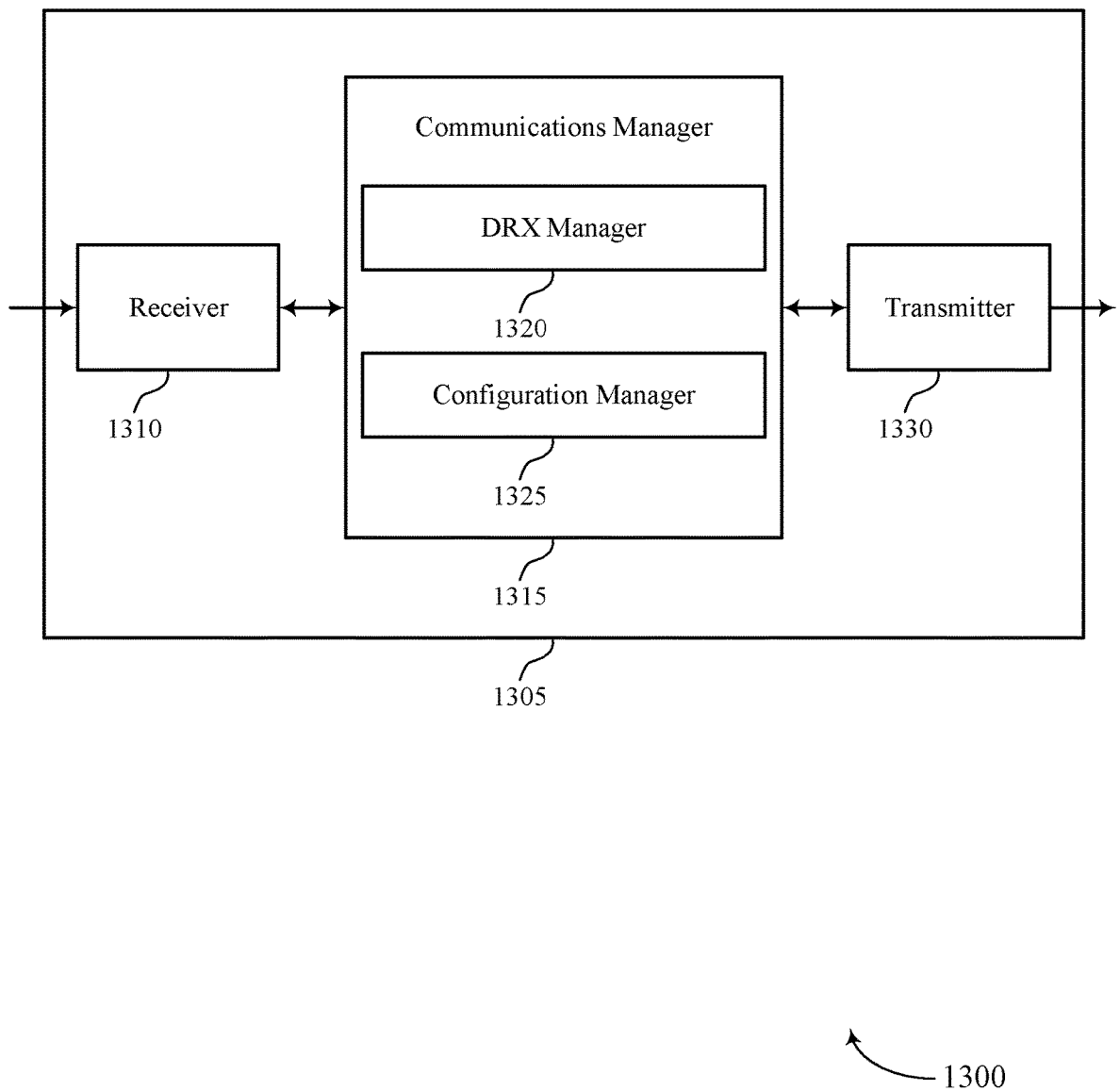

FIG. 13 shows a block diagram 1300 of a device 1305 that supports discontinuous reception techniques with non-uniform cycle durations in accordance with aspects of the present disclosure. The device 1305 may be an example of aspects of a device 1205, or a base station 105 as described herein. The device 1305 may include a receiver 1310, a communications manager 1315, and a transmitter 1330. The device 1305 may also include a processor. Each of these components may be in communication with one another (e.g., via one or more buses).

The receiver 1310 may receive information such as packets, user data, or control information associated with various information channels (e.g., control channels, data channels, and information related to discontinuous reception techniques with non-uniform cycle durations, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a DRX manager 1320 and a configuration manager 1325. The communications manager 1315 may be an example of aspects of the communications manager 1510 described herein.

The DRX manager 1320 may identify a traffic periodicity for wireless communications traffic that is transmitted to a UE.

The configuration manager 1325 may determine, based on the traffic periodicity, a discontinuous reception cycle configuration for the UE that indicates a set of discontinuous reception cycles within a discontinuous reception period that each have an ON-duration during which the UE is to wake up from a sleep mode to monitor for transmissions from the base station, where the UE transitions to the sleep mode after one or more of the ON-durations until the start of a subsequent ON-duration, and where at least one of the set of discontinuous reception cycles has a different cycle duration than other of the set of discontinuous reception cycles within the discontinuous reception period and transmit the discontinuous reception cycle configuration to the UE.

The transmitter 1330 may transmit signals generated by other components of the device 1305. In some examples, the transmitter 1330 may be collocated with a receiver 1310 in a transceiver module. For example, the transmitter 1330 may be an example of aspects of the transceiver 1520 described with reference to FIG. 15. The transmitter 1330 may utilize a single antenna or a set of antennas.

Figure 14:
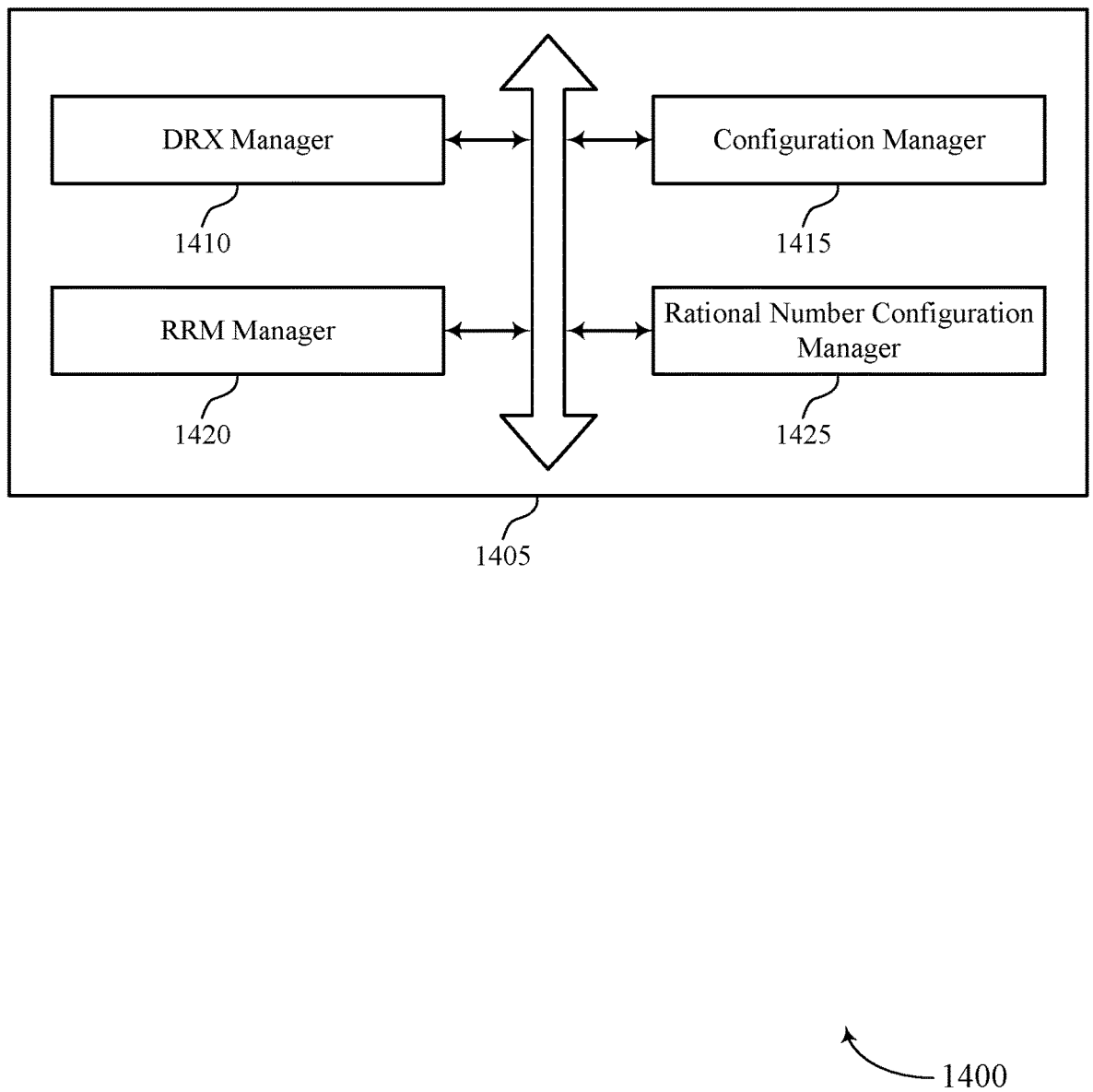
FIG. 14 shows a block diagram of a communications manager that supports discontinuous reception techniques with non-uniform cycle durations in accordance with aspects of the present disclosure.

FIG. 14 shows a block diagram 1400 of a communications manager 1405 that supports discontinuous reception techniques with non-uniform cycle durations in accordance with aspects of the present disclosure. The communications manager 1405 may be an example of aspects of a communications manager 1215, a communications manager 1315, or a communications manager 1510 described herein. The communications manager 1405 may include a DRX manager 1410, a configuration manager 1415, a RRM manager 1420, and a rational number configuration manager 1425. Each of these modules may communicate, directly or indirectly, with one another (e.g., via one or more buses).

The DRX manager 1410 may identify a traffic periodicity for wireless communications traffic that is transmitted to a UE. In some cases, a discontinuous reception period corresponds to an anchor cycle duration that spans the set of discontinuous reception cycles, and where at least one of the set of discontinuous reception cycles has a different cycle duration than other of the set of discontinuous reception cycles. In some cases, the discontinuous reception cycle configuration includes a first discontinuous reception cycle duration for a first subset of the set of discontinuous reception cycles and a second discontinuous reception cycle duration for one or more leap cycles of the set of discontinuous reception cycles.

In some cases, the discontinuous reception cycle configuration includes a first starting offset for a first ON-duration within at least a first discontinuous reception cycle of the set of discontinuous reception cycles, and a second starting offset for a second ON-duration within at least a second discontinuous reception cycle of the set of discontinuous reception cycles, where the first starting offset is different than the second starting offset.

In some cases, the discontinuous reception cycle configuration includes an outer discontinuous reception cycle configuration that indicates a first duration of an outer discontinuous reception cycle that corresponds to the discontinuous reception period, where each outer discontinuous reception cycle has a same first duration, and where. In some cases, the discontinuous reception cycle configuration further includes an inner discontinuous reception cycle configuration that indicates two or more inner discontinuous reception cycles within each outer discontinuous reception, and where the cycle duration is associated with each inner discontinuous reception cycle and at least one of the inner discontinuous reception cycles has a different cycle duration than other of the inner discontinuous reception cycles. In some cases, one or more radio resource management procedures are performed based on the outer discontinuous reception cycle configuration. In some cases, a start of an initial inner discontinuous reception cycle is aligned with a start of an outer discontinuous reception cycle, and an end of a last discontinuous reception cycle is aligned with an end of the outer discontinuous reception cycle.

The configuration manager 1415 may determine, based on the traffic periodicity, a discontinuous reception cycle configuration for the UE that indicates a set of discontinuous reception cycles within a discontinuous reception period that each have an ON-duration during which the UE is to wake up from a sleep mode to monitor for transmissions from the base station, where the UE transitions to the sleep mode after one or more of the ON-durations until the start of a subsequent ON-duration, and where at least one of the set of discontinuous reception cycles has a different cycle duration than other of the set of discontinuous reception cycles within the discontinuous reception period. In some examples, the configuration manager 1415 may transmit the discontinuous reception cycle configuration to the UE. In some examples, the configuration manager 1415 may transmit radio resource control signaling that indicates the anchor cycle duration, a number of discontinuous reception cycles within the anchor cycle duration, and the cycle duration of each of the discontinuous reception cycles. In some cases, one or more of the first starting offset or the second starting offset is a predetermined starting offset or is signaled to the UE. In some cases, one or more of the first starting offset or the second starting offset is signaled to the UE in one or more of DCI or a MAC-CE.

The RRM manager 1420 may perform various RRM procedures at the base station. In some cases, one or more radio resource management procedures are performed based on the anchor cycle duration or outer cycle configuration.

The rational number configuration manager 1425 may configure DRX cycle durations based on a rational number associated with a traffic periodicity for communications with a UE. In some cases, the discontinuous reception cycle configuration includes an indication of a rational number that indicates the cycle duration associated with each discontinuous reception cycle within the discontinuous reception period, and where a start time of each of the set of ON-durations is adjusted at the UE to align with a timing boundary used for wireless communications between the UE and the base station. In some cases, the start time of each of the set of ON-durations is adjusted to align with a nearest timing boundary, a next timing boundary, or a previous timing boundary. In some cases, the timing boundary is a slot boundary or a symbol boundary.

Figure 15:
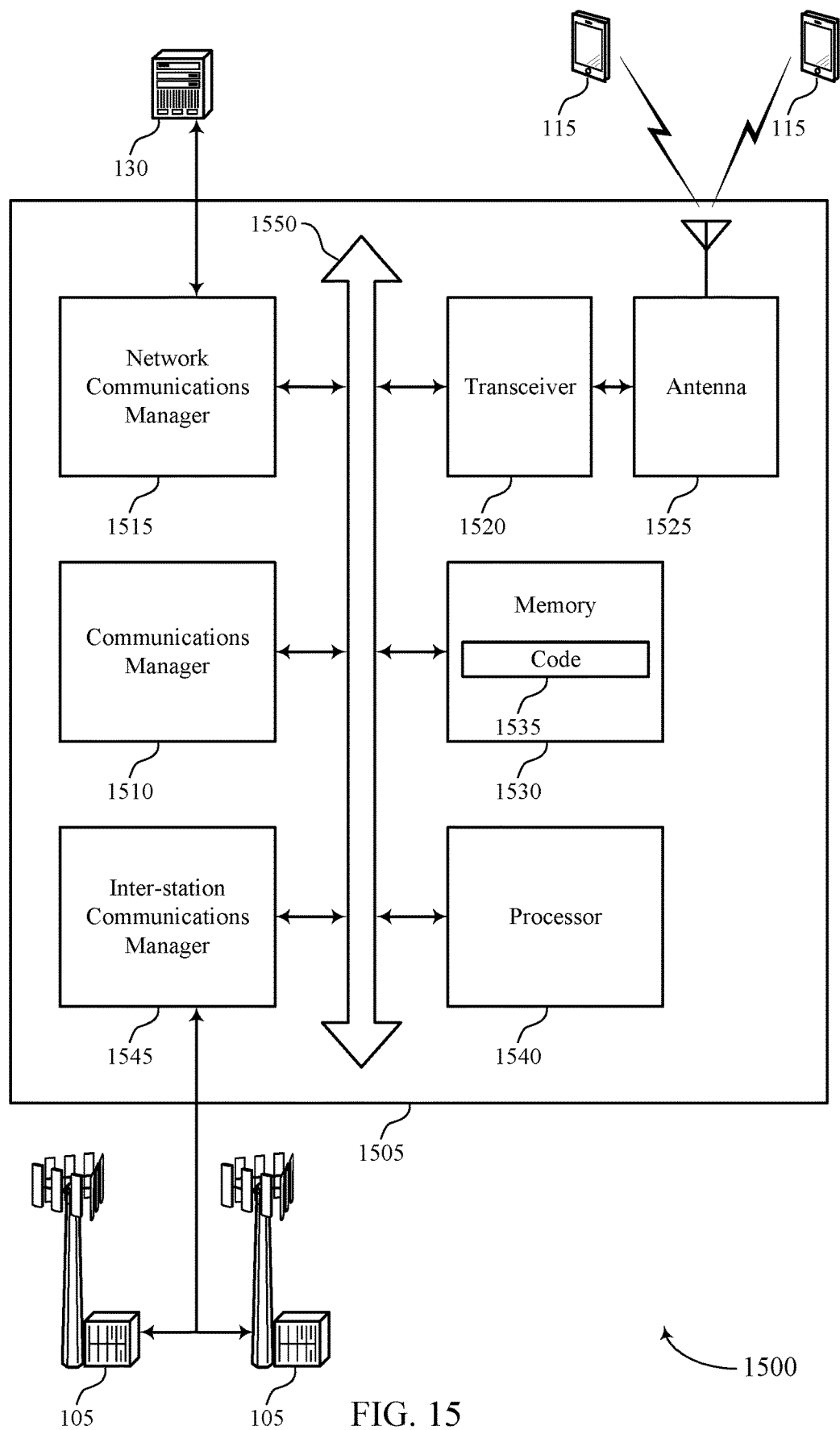
FIG. 15 shows a diagram of a system including a device that supports discontinuous reception techniques with non-uniform cycle durations in accordance with aspects of the present disclosure.

FIG. 15 shows a diagram of a system 1500 including a device 1505 that supports discontinuous reception techniques with non-uniform cycle durations in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may identify a traffic periodicity for wireless communications traffic that is transmitted to a UE, determine, based on the traffic periodicity, a discontinuous reception cycle configuration for the UE that indicates a set of discontinuous reception cycles within a discontinuous reception period that each have an ON-duration during which the UE is to wake up from a sleep mode to monitor for transmissions from the base station, where the UE transitions to the sleep mode after one or more of the ON-durations until the start of a subsequent ON-duration, and where at least one of the set of discontinuous reception cycles has a different cycle duration than other of the set of discontinuous reception cycles within the discontinuous reception period, and transmit the discontinuous reception cycle configuration to the UE.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting discontinuous reception techniques with non-uniform cycle durations).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
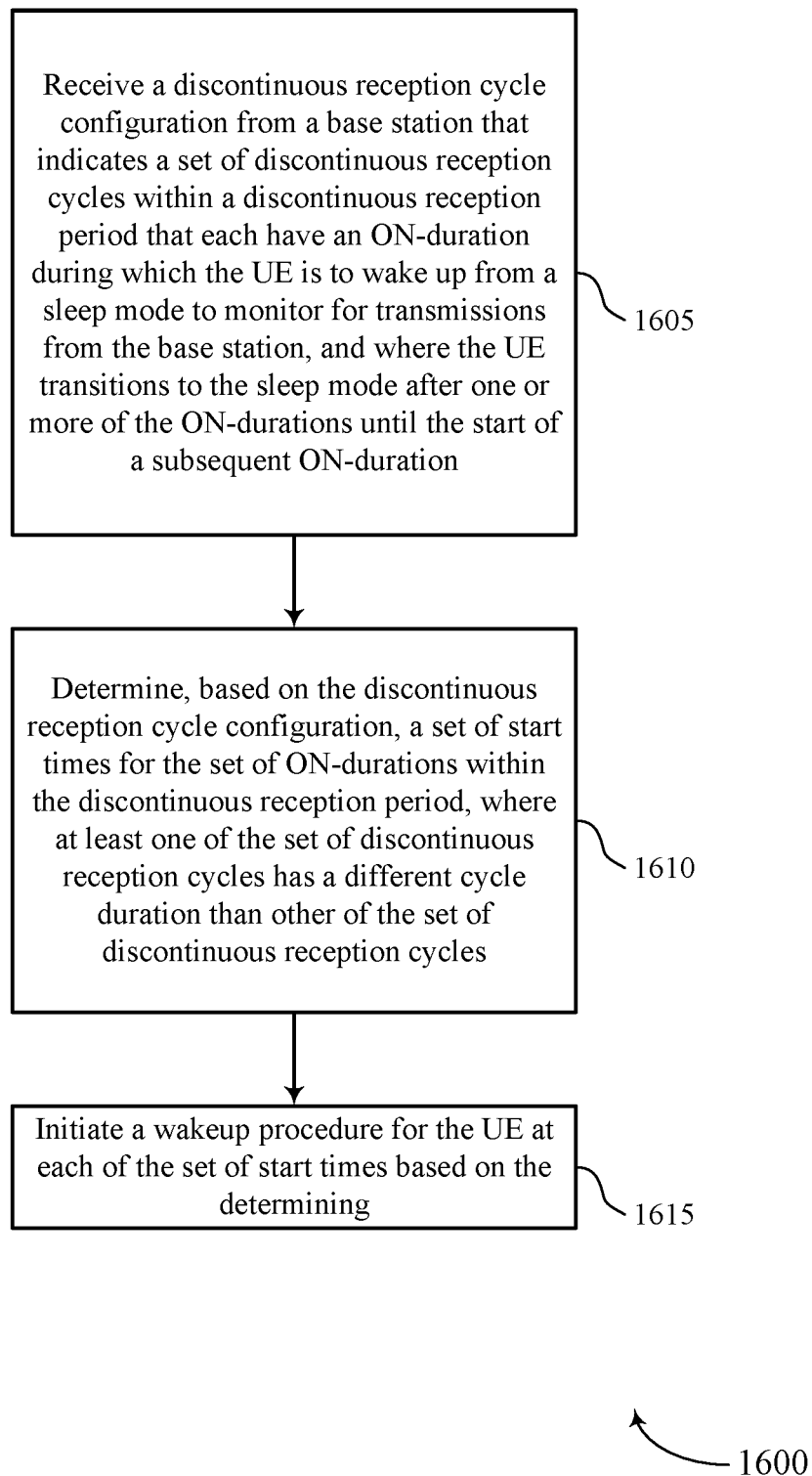
FIGS. 16 through 21 show flowcharts illustrating methods that support discontinuous reception techniques with non-uniform cycle durations in accordance with aspects of the present disclosure.

FIG. 16 shows a flowchart illustrating a method 1600 that supports discontinuous reception techniques with non-uniform cycle durations in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive a discontinuous reception cycle configuration from a base station that indicates a set of discontinuous reception cycles within a discontinuous reception period that each have an ON-duration during which the UE is to wake up from a sleep mode to monitor for transmissions from the base station, and where the UE transitions to the sleep mode after one or more of the ON-durations until the start of a subsequent ON-duration. The operations of 1605 may be performed according to the methods described herein. In some examples, aspects of the operations of 1605 may be performed by a configuration manager as described with reference to FIGS. 8 through 11.

At 1610, the UE may determine, based on the discontinuous reception cycle configuration, a set of start times for the set of ON-durations within the discontinuous reception period, where at least one of the set of discontinuous reception cycles has a different cycle duration than other of the set of discontinuous reception cycles. The operations of 1610 may be performed according to the methods described herein. In some examples, aspects of the operations of 1610 may be performed by a DRX manager as described with reference to FIGS. 8 through 11.

At 1615, the UE may initiate a wakeup procedure for the UE at each of the set of start times based on the determining. The operations of 1615 may be performed according to the methods described herein. In some examples, aspects of the operations of 1615 may be performed by a DRX manager as described with reference to FIGS. 8 through 11.

Figure 17:
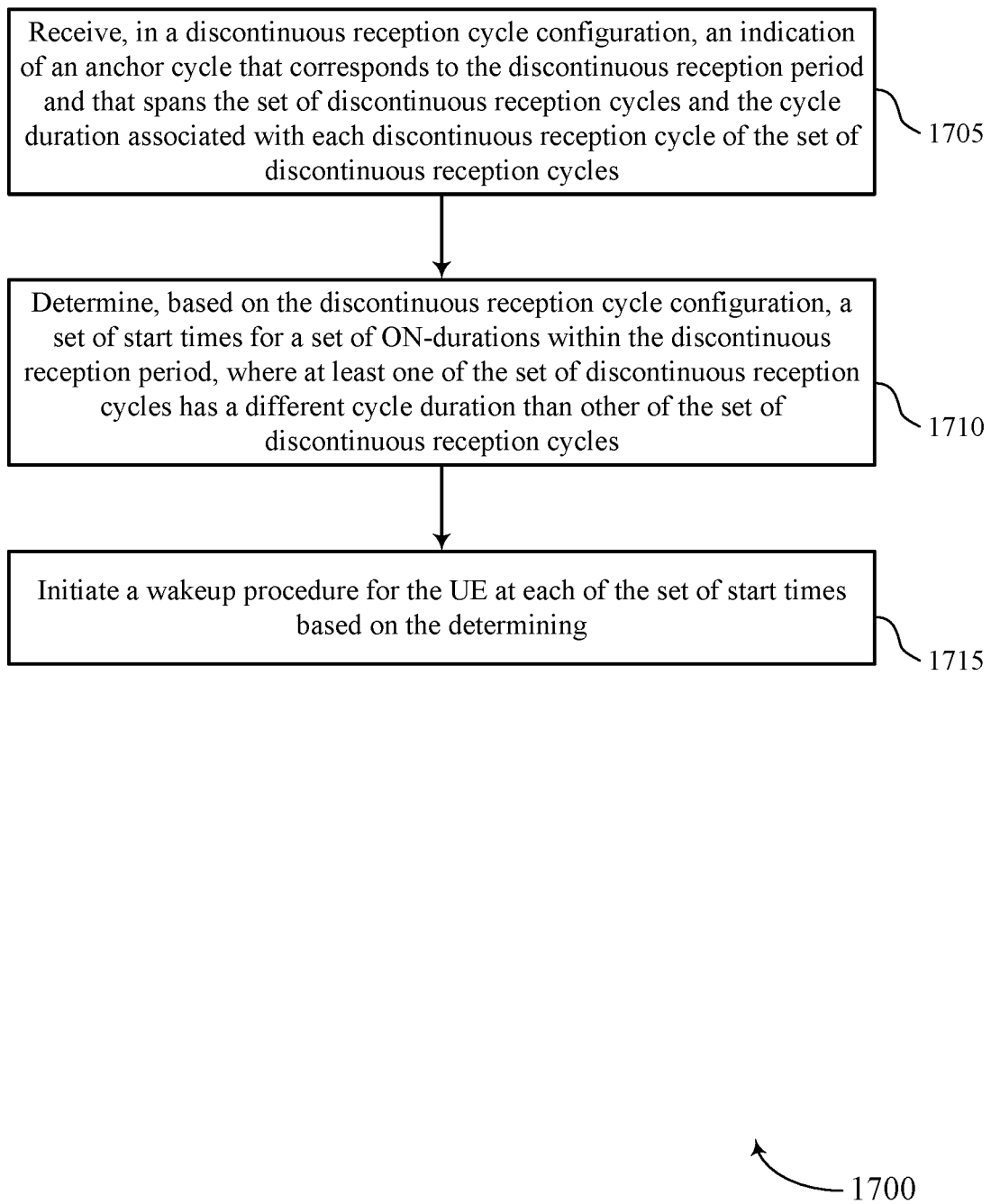

FIG. 17 shows a flowchart illustrating a method 1700 that supports discontinuous reception techniques with non-uniform cycle durations in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may receive, in a discontinuous reception cycle configuration, an indication of an anchor cycle that corresponds to the discontinuous reception period and that spans the set of discontinuous reception cycles and the cycle duration associated with each discontinuous reception cycle of the set of discontinuous reception cycles. The operations of 1705 may be performed according to the methods described herein. In some examples, aspects of the operations of 1705 may be performed by a configuration manager as described with reference to FIGS. 8 through 11. In some cases, the UE may receive radio resource control signaling that indicates the anchor cycle, a number of discontinuous reception cycles within the anchor cycle, and the cycle duration of each of the discontinuous reception cycles. In some cases, the discontinuous reception cycle configuration includes a first discontinuous reception cycle duration for a first subset of the set of discontinuous reception cycles and a second discontinuous reception cycle duration for one or more leap cycles of the set of discontinuous reception cycles. In some cases, one or more radio resource management procedures are performed based on the anchor cycle. The operations of 1725 may be performed according to the methods described herein. In some examples, aspects of the operations of 1725 may be performed by a RRM manager as described with reference to FIGS. 8 through 11.

At 1710, the UE may determine, based on the discontinuous reception cycle configuration, a set of start times for a set of ON-durations within the discontinuous reception period, where at least one of the set of discontinuous reception cycles has a different cycle duration than other of the set of discontinuous reception cycles. The operations of 1710 may be performed according to the methods described herein. In some examples, aspects of the operations of 1710 may be performed by a DRX manager as described with reference to FIGS. 8 through 11.

At 1715, the UE may initiate a wakeup procedure for the UE at each of the set of start times based on the determining. The operations of 1715 may be performed according to the methods described herein. In some examples, aspects of the operations of 1715 may be performed by a DRX manager as described with reference to FIGS. 8 through 11.

Figure 18:
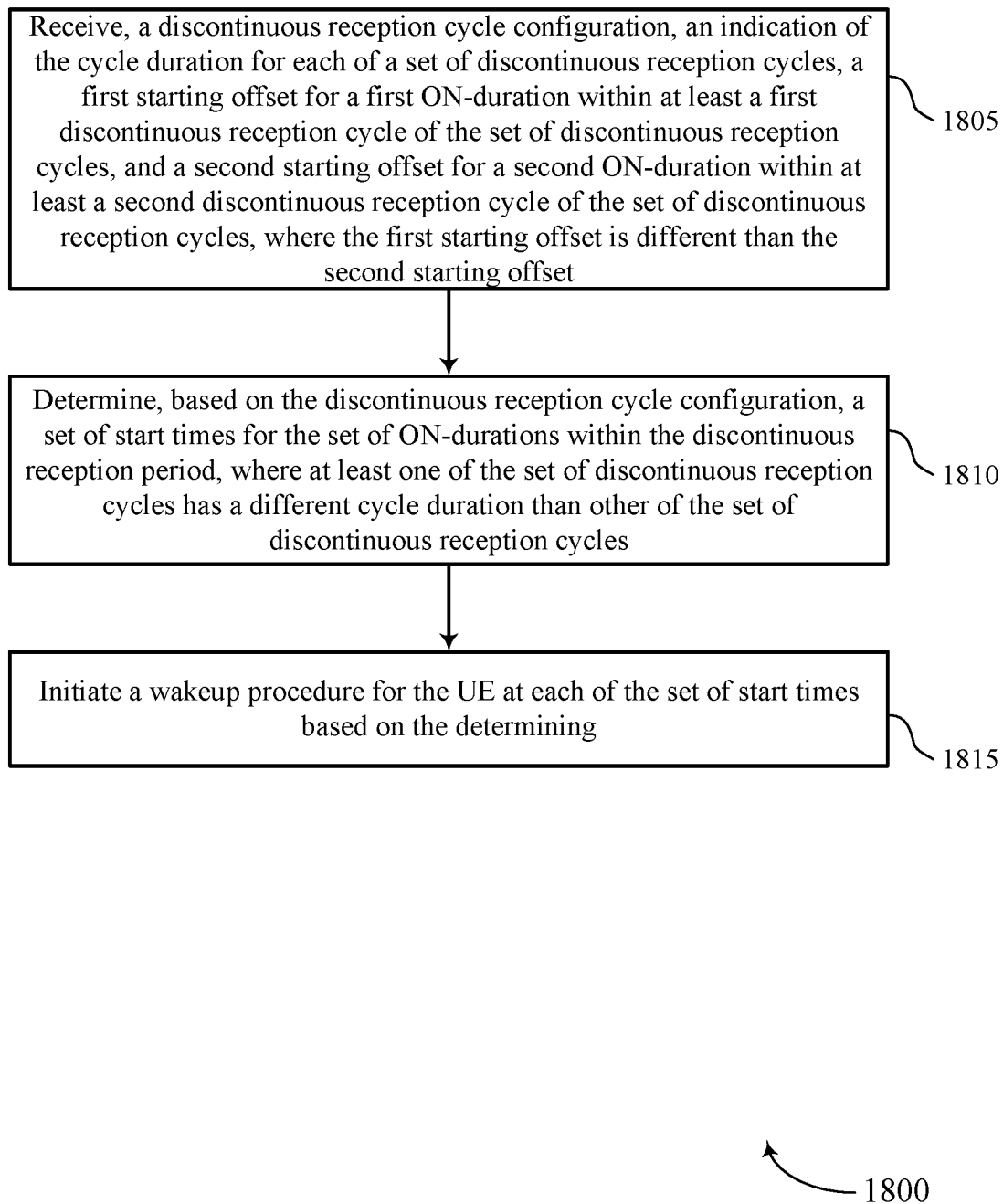

FIG. 18 shows a flowchart illustrating a method 1800 that supports discontinuous reception techniques with non-uniform cycle durations in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may receive, a discontinuous reception cycle configuration, an indication of the cycle duration for each of the set of discontinuous reception cycles, a first starting offset for a first ON-duration within at least a first discontinuous reception cycle of the set of discontinuous reception cycles, and a second starting offset for a second ON-duration within at least a second discontinuous reception cycle of the set of discontinuous reception cycles, where the first starting offset is different than the second starting offset. The operations of 1805 may be performed according to the methods described herein. In some examples, aspects of the operations of 1805 may be performed by a configuration manager as described with reference to FIGS. 8 through 11. In some cases, one or more of the first starting offset or the second starting offset is a predetermined starting offset or is signaled by the base station. In some cases, one or more of the first starting offset or the second starting offset is signaled by the base station in one or more of DCI or a MAC-CE.

At 1810, the UE may determine, based on the discontinuous reception cycle configuration, a set of start times for the set of ON-durations within the discontinuous reception period, where at least one of the set of discontinuous reception cycles has a different cycle duration than other of the set of discontinuous reception cycles. The operations of 1810 may be performed according to the methods described herein. In some examples, aspects of the operations of 1810 may be performed by a DRX manager as described with reference to FIGS. 8 through 11.

At 1815, the UE may initiate a wakeup procedure for the UE at each of the set of start times based on the determining. The operations of 1815 may be performed according to the methods described herein. In some examples, aspects of the operations of 1815 may be performed by a DRX manager as described with reference to FIGS. 8 through 11.

Figure 19:
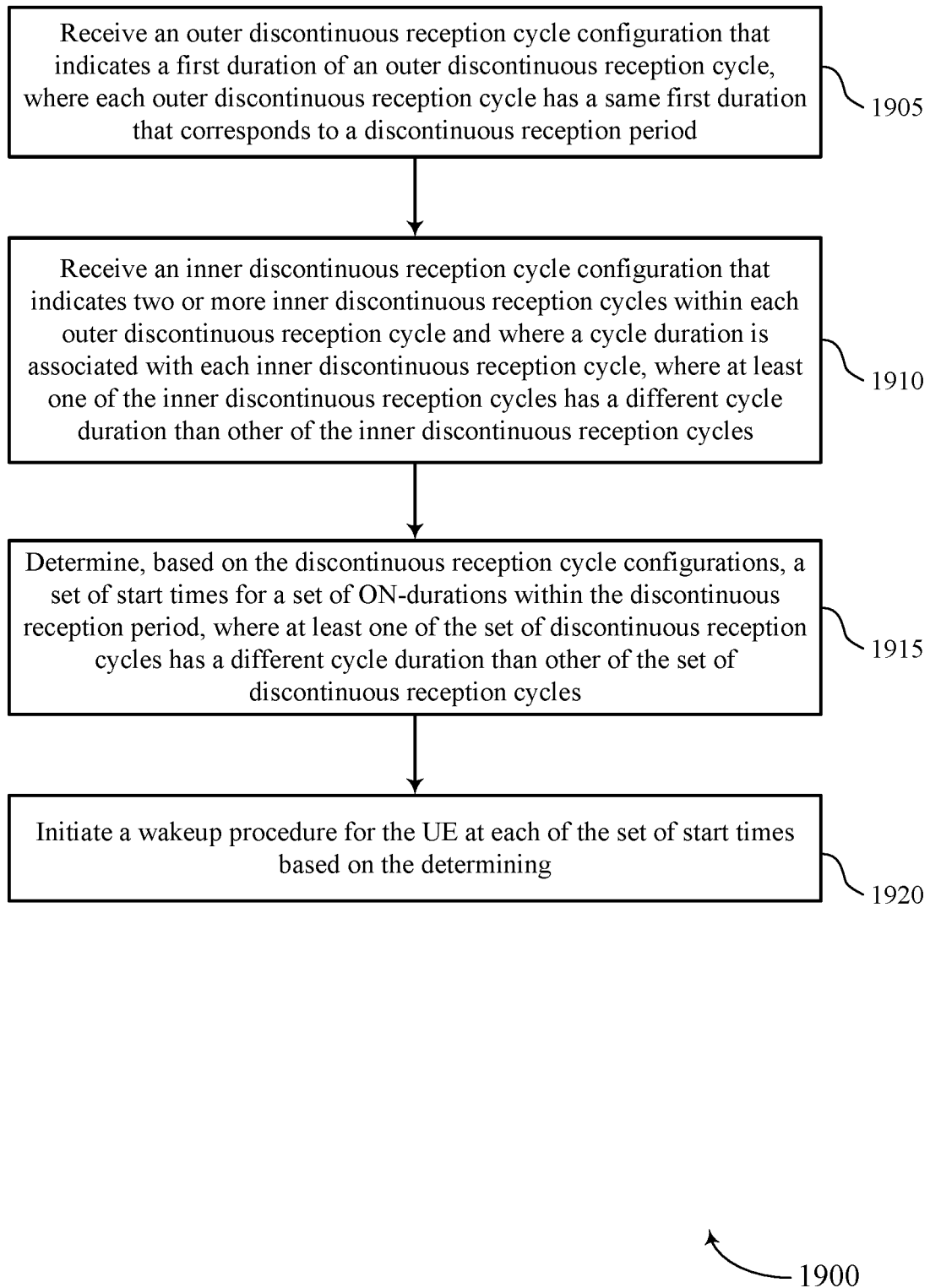

FIG. 19 shows a flowchart illustrating a method 1900 that supports discontinuous reception techniques with non-uniform cycle durations in accordance with aspects of the present disclosure. The operations of method 1900 may be implemented by a UE 115 or its components as described herein. For example, the operations of method 1900 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1905, the UE may receive an outer discontinuous reception cycle configuration that indicates a first duration of an outer discontinuous reception cycle, where each outer discontinuous reception cycle has a same first duration that corresponds to a discontinuous reception period. The operations of 1905 may be performed according to the methods described herein. In some examples, aspects of the operations of 1905 may be performed by a configuration manager as described with reference to FIGS. 8 through 11.

At 1910, the UE may receive an inner discontinuous reception cycle configuration that indicates two or more inner discontinuous reception cycles within each outer discontinuous reception cycle and where a cycle duration is associated with each inner discontinuous reception cycle, where at least one of the inner discontinuous reception cycles has a different cycle duration than other of the inner discontinuous reception cycles. The operations of 1910 may be performed according to the methods described herein. In some examples, aspects of the operations of 1910 may be performed by a configuration manager as described with reference to FIGS. 8 through 11. In some cases, one or more radio resource management procedures are performed based on the outer discontinuous reception cycle configuration. In some cases, a start of an initial inner discontinuous reception cycle is aligned with a start of an outer discontinuous reception cycle, and an end of a last discontinuous reception cycle is aligned with an end of the outer discontinuous reception cycle.

At 1915, the UE may determine, based on the discontinuous reception cycle configurations, a set of start times for a set of ON-durations within the discontinuous reception period, where at least one of the set of discontinuous reception cycles has a different cycle duration than other of the set of discontinuous reception cycles. The operations of 1915 may be performed according to the methods described herein. In some examples, aspects of the operations of 1915 may be performed by a DRX manager as described with reference to FIGS. 8 through 11.

At 1920, the UE may initiate a wakeup procedure for the UE at each of the set of start times based on the determining. The operations of 1920 may be performed according to the methods described herein. In some examples, aspects of the operations of 1920 may be performed by a DRX manager as described with reference to FIGS. 8 through 11.

Figure 20:
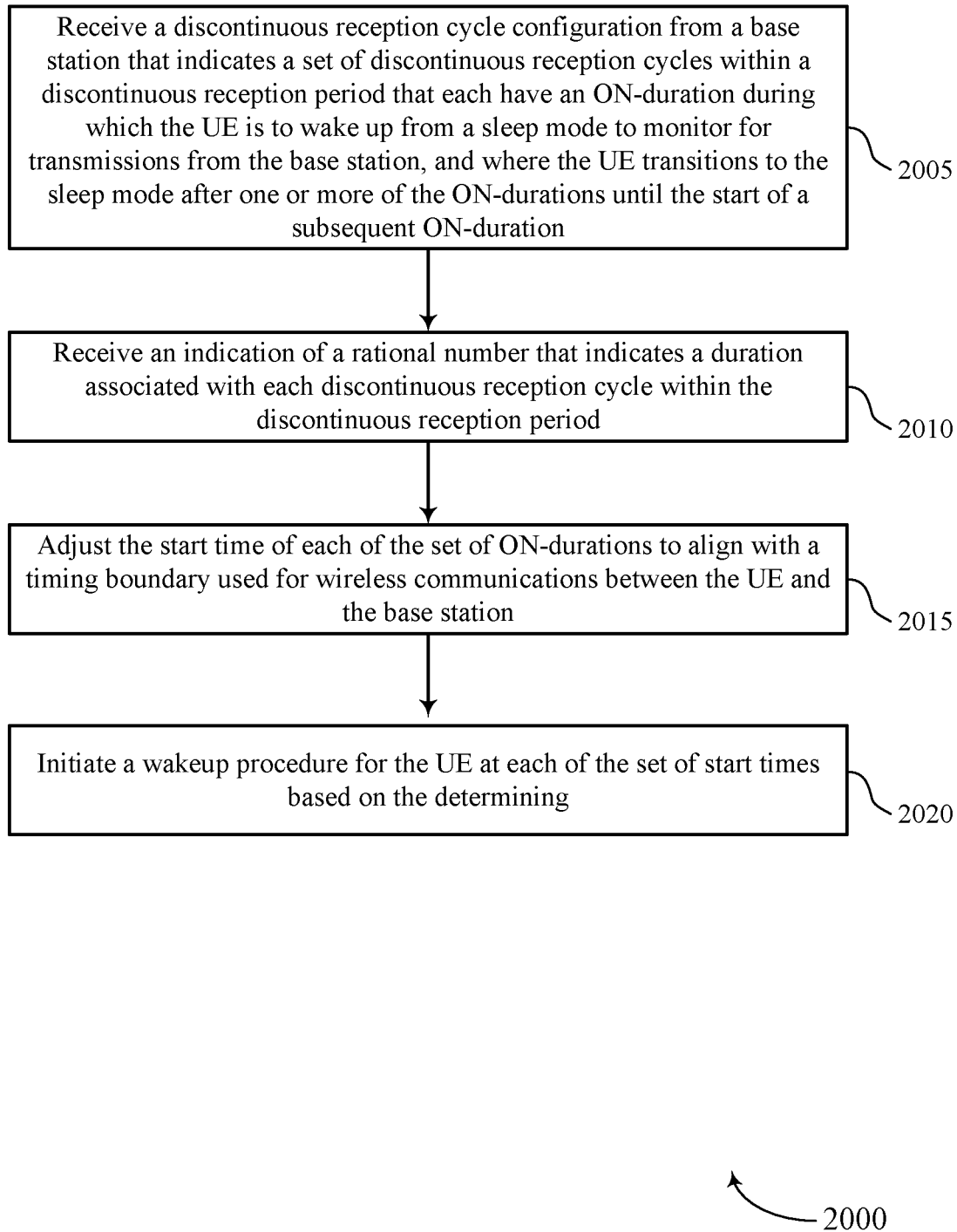

FIG. 20 shows a flowchart illustrating a method 2000 that supports discontinuous reception techniques with non-uniform cycle durations in accordance with aspects of the present disclosure. The operations of method 2000 may be implemented by a UE 115 or its components as described herein. For example, the operations of method 2000 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2005, the UE may receive a discontinuous reception cycle configuration from a base station that indicates a set of discontinuous reception cycles within a discontinuous reception period that each have an ON-duration during which the UE is to wake up from a sleep mode to monitor for transmissions from the base station, and where the UE transitions to the sleep mode after one or more of the ON-durations until the start of a subsequent ON-duration. The operations of 2005 may be performed according to the methods described herein. In some examples, aspects of the operations of 2005 may be performed by a configuration manager as described with reference to FIGS. 8 through 11.

At 2010, the UE may receive an indication of a rational number that indicates a duration associated with each discontinuous reception cycle within the discontinuous reception period. The operations of 2010 may be performed according to the methods described herein. In some examples, aspects of the operations of 2010 may be performed by a rational number configuration manager as described with reference to FIGS. 8 through 11.

At 2015, the UE may adjust the start time of each of the set of ON-durations to align with a timing boundary used for wireless communications between the UE and the base station. The operations of 2015 may be performed according to the methods described herein. In some examples, aspects of the operations of 2015 may be performed by a rational number configuration manager as described with reference to FIGS. 8 through 11. In some cases, the start time of each of the set of ON-durations is adjusted to align with a nearest timing boundary, a next timing boundary, or a previous timing boundary. In some cases, the timing boundary is a slot boundary or a symbol boundary.

At 2020, the UE may initiate a wakeup procedure for the UE at each of the set of start times based on the determining. The operations of 2020 may be performed according to the methods described herein. In some examples, aspects of the operations of 2020 may be performed by a DRX manager as described with reference to FIGS. 8 through 11.

Figure 21:
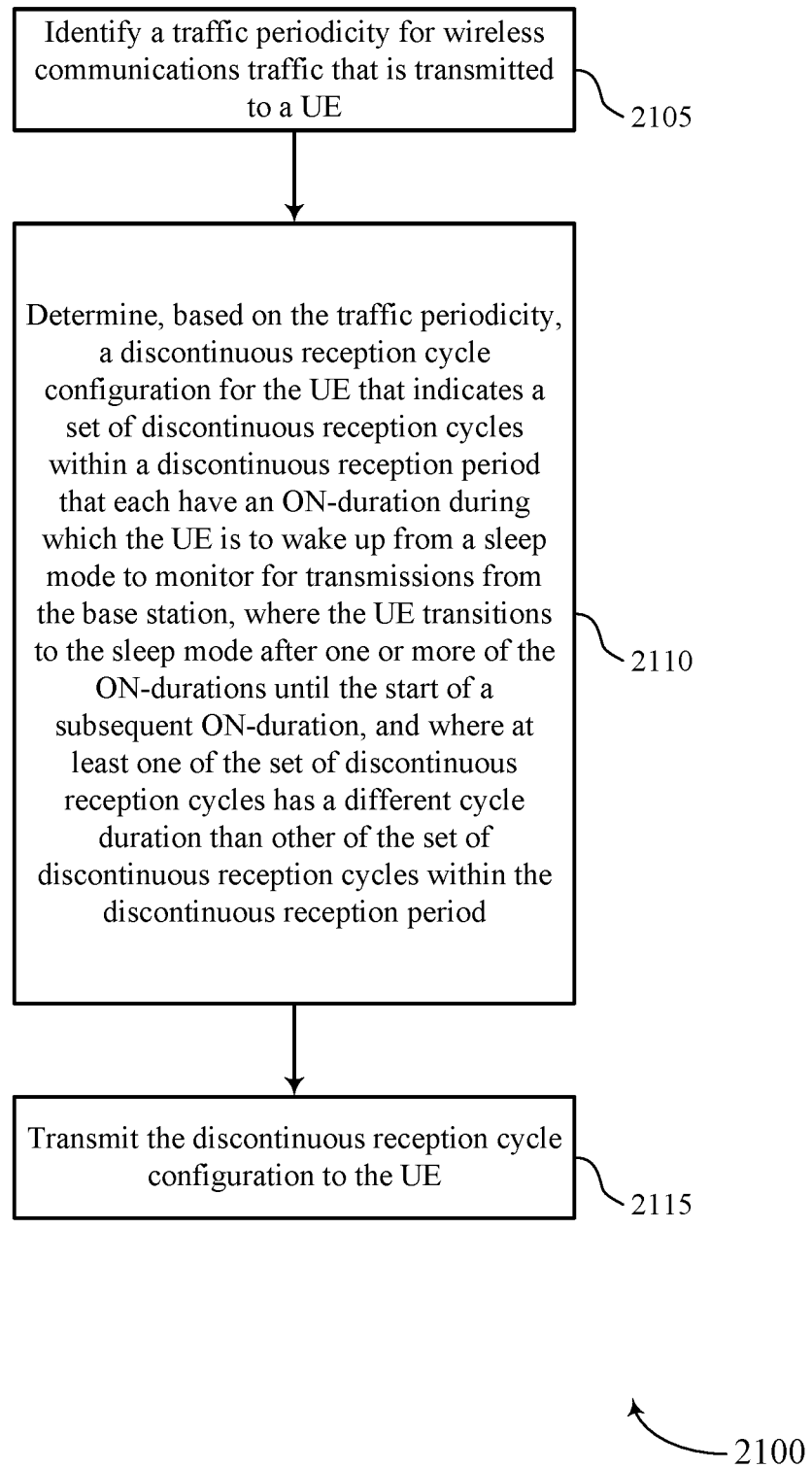

FIG. 21 shows a flowchart illustrating a method 2100 that supports discontinuous reception techniques with non-uniform cycle durations in accordance with aspects of the present disclosure. The operations of method 2100 may be implemented by a base station 105 or its components as described herein. For example, the operations of method 2100 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2105, the base station may identify a traffic periodicity for wireless communications traffic that is transmitted to a UE. The operations of 2105 may be performed according to the methods described herein. In some examples, aspects of the operations of 2105 may be performed by a DRX manager as described with reference to FIGS. 12 through 15.

At 2110, the base station may determine, based on the traffic periodicity, a discontinuous reception cycle configuration for the UE that indicates a set of discontinuous reception cycles within a discontinuous reception period that each have an ON-duration during which the UE is to wake up from a sleep mode to monitor for transmissions from the base station, where the UE transitions to the sleep mode after one or more of the ON-durations until the start of a subsequent ON-duration, and where at least one of the set of discontinuous reception cycles has a different cycle duration than other of the set of discontinuous reception cycles within the discontinuous reception period. The operations of 2110 may be performed according to the methods described herein. In some examples, aspects of the operations of 2110 may be performed by a configuration manager as described with reference to FIGS. 12 through 15.

At 2115, the base station may transmit the discontinuous reception cycle configuration to the UE. The operations of 2115 may be performed according to the methods described herein. In some examples, aspects of the operations of 2115 may be performed by a configuration manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "of" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a discontinuous reception cycle configuration that indicates a plurality of discontinuous reception cycles equally spaced within a discontinuous reception period, the plurality of discontinuous reception cycles having a plurality of ON-durations during which the UE is to wake up from a sleep mode to monitor for transmissions;
   determining, based at least in part on the discontinuous reception cycle configuration, a plurality of start times comprising a start time for each ON-duration of the plurality of ON-durations of the plurality of discontinuous reception cycles and a start time for an offset ON-duration that is outside a first instance of the discontinuous reception period, wherein a period between consecutive ON-durations within the first instance of the discontinuous reception period has a duration different from a period between consecutive ON-durations including the offset ON-duration; and
   initiating a wakeup procedure for the UE at each of the plurality of start times based at least in part on the determining.

2. The method of claim 1, wherein the determining the plurality of start times comprises determining the start time for the offset ON-duration based at least in part on a starting offset, and wherein the starting offset is a known or determined starting value.

3. The method of claim 1, further comprising:
   receiving an indication of a starting offset, the receiving the indication being different from the receiving the discontinuous reception cycle configuration, and wherein the determining the plurality of start times comprises determining the start time for the offset ON-duration based at least in part on the starting offset.

4. The method of claim 3, wherein the receiving the indication comprises receiving the indication of the starting offset in at least one of downlink control information or a medium access control (MAC) control element (CE).

5. The method of claim 1, wherein the discontinuous reception cycle configuration comprises an indication of a first starting offset, and wherein the determining the plurality of start times comprises determining the start time for the offset ON-duration based at least in part on the first starting offset.

6. The method of claim 5, wherein the determining the plurality of start times comprises determining a start time for a second offset ON-duration based at least in part on the first starting offset.

7. The method of claim 5, wherein the receiving the discontinuous reception cycle configuration comprises receiving an indication of a second starting offset, and wherein the determining the plurality of start times comprises determining a start time for a second offset ON-duration based at least in part on the second starting offset, the start time for the second offset ON-duration being within the discontinuous reception period.

8. The method of claim 1, wherein the receiving the discontinuous reception cycle configuration comprises receiving an indication of a first inner discontinuous reception cycle starting offset and a second inner discontinuous reception cycle starting offset, wherein a first inner discontinuous reception cycle has a period that is different from a period of a second inner discontinuous reception cycle, and wherein the first inner discontinuous reception cycle and the second inner discontinuous reception cycle are associated with the discontinuous reception period.

9. The method of claim 1, wherein the receiving the discontinuous reception cycle configuration comprises receiving an indication of an anchor cycle that has a period equal to the discontinuous reception period.

10. The method of claim 9, wherein the receiving the discontinuous reception cycle configuration comprises receiving an indication of an additional discontinuous reception cycle associated with the discontinuous reception period, wherein the additional discontinuous reception cycle associated with the discontinuous reception period has a period less than the discontinuous reception period.

11. The method of claim 10, wherein the additional discontinuous reception cycle has a period different from a period of each discontinuous reception cycle of the plurality of discontinuous reception cycles.

12. The method of claim 10, wherein a first discontinuous reception cycle indicates a first discontinuous reception cycle duration for a first subset of a plurality of additional discontinuous reception cycles within the anchor cycle and the additional discontinuous reception cycle indicates a second discontinuous reception cycle duration for one or more leap cycles within the anchor cycle.

13. The method of claim 1, further comprising:
   performing one or more radio resource management procedures based on the discontinuous reception period.

14. The method of claim 1, wherein the receiving the discontinuous reception cycle configuration comprises receiving an indication of a non-integer rational number, and wherein the determining the plurality of start times comprises determining the start time for each ON-duration of the plurality of ON-durations based at least in part on the non-integer rational number.

15. The method of claim 14, further comprising:
   adjusting the start time for each ON-duration of the plurality of ON-durations to align with a timing boundary used for wireless communications between the UE and a network entity.

16. The method of claim 15, wherein the adjusting the start time comprises adjusting the start time for each ON-duration of the plurality of ON-durations to align with a timing boundary nearest to the start time for each ON-duration of the plurality of ON-durations based at least in part on the non-integer rational number, a timing boundary subsequent to the start time for each ON-duration of the plurality of ON-durations based at least in part on the non-integer rational number, or a timing boundary preceding the start time for each ON-duration of the plurality of ON-durations based at least in part on the non-integer rational number.

17. The method of claim 15, wherein the timing boundary is a slot boundary or a symbol boundary.

18. The method of claim 15, further comprising:
initiating a discontinuous reception cycle inactivity timer based at least in part on an absolute time relative to the start time for each ON-duration of the plurality of ON-durations based at least in part on the non-integer rational number or the adjusted start time for each ON-duration of the plurality of ON-durations to align with the timing boundary.

19. A method for wireless communication at a network entity, comprising:
identifying a traffic periodicity associated with wireless communications traffic to a user equipment (UE);
determining, based at least in part on the traffic periodicity, a plurality of discontinuous reception cycles equally spaced within a discontinuous reception period, the plurality of discontinuous reception cycles having a plurality of ON-durations during which the UE is to wake up from a sleep mode to monitor for transmissions from, and a start time for an offset ON-duration that is outside a first instance of the discontinuous reception period, wherein a period between consecutive ON-durations within the first instance of the discontinuous reception period has a duration different from a period between consecutive ON-durations including the offset ON-duration; and
transmitting a discontinuous reception cycle configuration that indicates at least the plurality of discontinuous reception cycles with and the discontinuous reception period to the UE.

20. The method of claim 19, further comprising:
transmitting an indication of a starting offset for determining the start time for the offset ON-duration, the transmitting the indication being different from the transmitting the discontinuous reception cycle configuration.

21. The method of claim 20, wherein the transmitting the indication comprises transmitting the indication of the starting offset to the UE in at least one of downlink control information or a medium access control (MAC) control element (CE).

22. The method of claim 19, wherein the discontinuous reception cycle configuration comprises an indication of a first starting offset for determining the start time for the offset ON-duration.

23. The method of claim 19, wherein the transmitting the discontinuous reception cycle configuration comprises transmitting an indication of an anchor cycle that has a period equal to the discontinuous reception period.

24. The method of claim 19, wherein the transmitting the discontinuous reception cycle configuration comprises transmitting an indication of a non-integer rational number, the non-integer rational number being associated with a start time for each ON-duration of the plurality of ON-durations.

25. An apparatus for wireless communication at a user equipment (UE), comprising:
a processor,
memory coupled with the processor; and
instructions stored in the memory and executable by the processor to cause the apparatus to:
receive a discontinuous reception cycle configuration that indicates a plurality of discontinuous reception cycles equally spaced within a discontinuous reception period, the plurality of discontinuous reception cycles having a plurality of ON-durations during which the UE is to wake up from a sleep mode to monitor for transmissions;
determine, based at least in part on the discontinuous reception cycle configuration, a plurality of start times comprising a start time for each ON-duration of the plurality of ON-durations of the plurality of discontinuous reception cycles and a start time for an offset ON-duration that is outside a first instance of the discontinuous reception period, wherein a period between consecutive ON-durations within the first instance of the discontinuous reception period has a duration different from a period between consecutive ON-durations including the offset ON-duration; and
initiate a wakeup procedure for the UE at each of the plurality of start times based at least in part on determining the plurality of start times.

26. An apparatus for wireless communication at a network entity, comprising:
a processor,
memory coupled with the processor; and
instructions stored in the memory and executable by the processor to cause the apparatus to:
identify a traffic periodicity associated with wireless communications traffic to a user equipment (UE);
determine, based at least in part on the traffic periodicity, a plurality of discontinuous reception cycles equally spaced within a discontinuous reception period, the plurality of discontinuous reception cycles having a plurality of ON-durations during which the UE is to wake up from a sleep mode to monitor for transmissions, and a start time for an offset ON-duration that is outside a first instance of the discontinuous reception period, wherein a period between consecutive ON-durations within the first instance of the discontinuous reception period has a duration different from a period between consecutive ON-durations including the offset ON-duration; and
transmit a discontinuous reception cycle configuration that indicates at least the plurality of discontinuous reception cycles and the discontinuous reception period to the UE.

* * * * *